US008711115B2

(12) United States Patent  
Ozawa et al.

(10) Patent No.: US 8,711,115 B2
(45) Date of Patent: Apr. 29, 2014

(54) DISPLAY CONTROL DEVICE, DISPLAY CONTROL METHOD, AND TOUCHPAD INPUT SYSTEM

(75) Inventors: Yuka Ozawa, Osaka (JP); Masaki Yamauchi, Osaka (JP)

(73) Assignee: Panasonic Corporation, Osaka (JP)

(*) Notice: Subject to any disclaimer, the term of this patent is extended or adjusted under 35 U.S.C. 154(b) by 444 days.

(21) Appl. No.: 13/257,661

(22) PCT Filed: Jan. 21, 2011

(86) PCT No.: PCT/JP2011/000320
§ 371 (c)(1),
(2), (4) Date: Sep. 20, 2011

(87) PCT Pub. No.: WO2011/096166
PCT Pub. Date: Aug. 11, 2011

(65) Prior Publication Data
US 2012/0007823 A1    Jan. 12, 2012

(30) Foreign Application Priority Data
Feb. 3, 2010 (JP) ................................. 2010-022413

(51) Int. Cl.
*G06F 3/041* (2006.01)
(52) U.S. Cl.
USPC .......... 345/173; 345/156; 345/157; 178/18.01
(58) Field of Classification Search
USPC ..................... 345/156–184; 178/18.01–18.11
See application file for complete search history.

(56) References Cited

U.S. PATENT DOCUMENTS

| 2004/0263491 A1* | 12/2004 | Ishigaki ......................... 345/177 |
| 2006/0022960 A1 | 2/2006 | Fukushima |
| 2008/0012831 A1* | 1/2008 | Bauman et al. ................ 345/173 |
| 2009/0225054 A1 | 9/2009 | Fukushima |
| 2009/0244005 A1 | 10/2009 | Fukushima |

(Continued)

FOREIGN PATENT DOCUMENTS

| JP | 10-091226 | 4/1998 |
| JP | 2001-306247 | 11/2001 |

(Continued)

OTHER PUBLICATIONS

International Search Report issued Apr. 19, 2011 in International (PCT) Application No. PCT/JP2011/000320.

*Primary Examiner* — Dmitriy Bolotin
(74) *Attorney, Agent, or Firm* — Wenderoth, Lind & Ponack, LLP.

(57) ABSTRACT

A display control device (300) which controls display of objects placed on a display screen (111), based on inputs on touchpads (201, 202), the display control device including: an operation ratio setting unit (301) which sets an operation ratio indicating a ratio between operation capabilities of a user for the respective touchpads; an assigning unit (302) which assigns regions of the display screen to the touchpads; a position-on-screen determining unit (303) which determines a pointing position indicating a position on the display screen, based on information indicating one of the assigned regions, the pointing position corresponding to a position of an input on one of the touchpads by the user; and a display control unit (305) which controls display of an object placed at the pointing position, wherein the assigning unit assigns at least either the regions of the screen or the objects to the touchpads based on the operation ratio.

24 Claims, 24 Drawing Sheets

(56) References Cited

U.S. PATENT DOCUMENTS

2010/0013792 A1  1/2010  Fukushima
2010/0103127 A1  4/2010  Park et al.
2011/0205169 A1* 8/2011  Yasutake .................. 345/173
2012/0013463 A1* 1/2012  Higashi et al. ............ 340/540

FOREIGN PATENT DOCUMENTS

| JP | 2003-067128 | 3/2003 |
| JP | 2006-039910 | 2/2006 |
| WO | 2008/103018 | 8/2008 |

* cited by examiner

FIG. 1
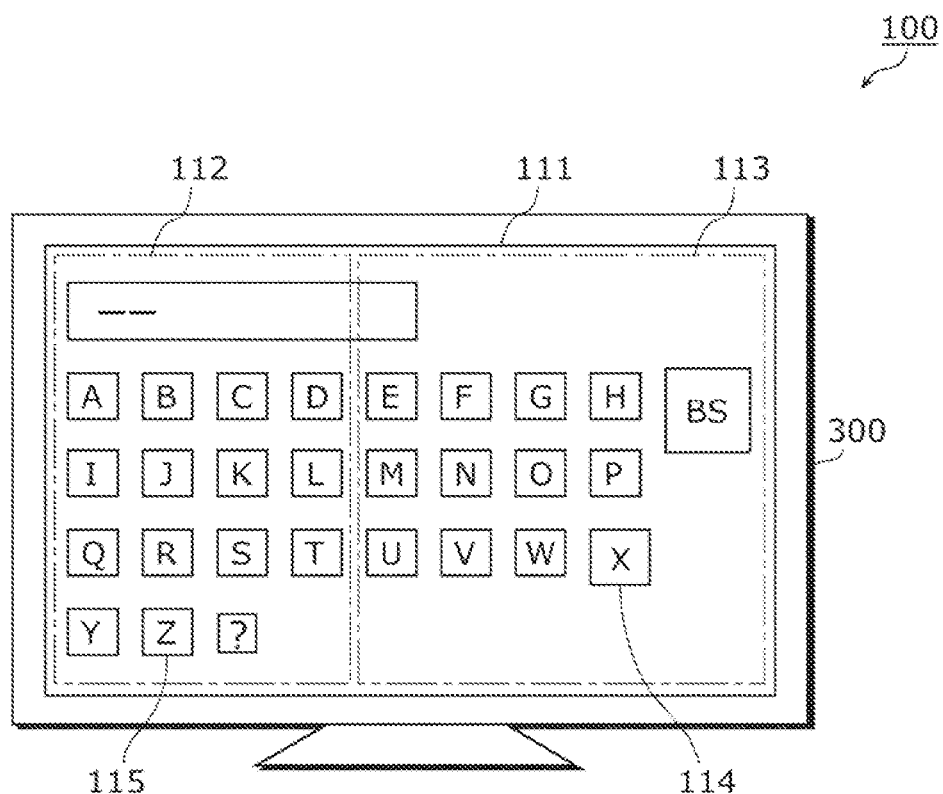
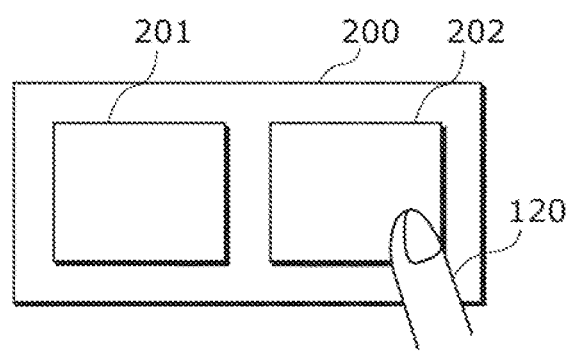

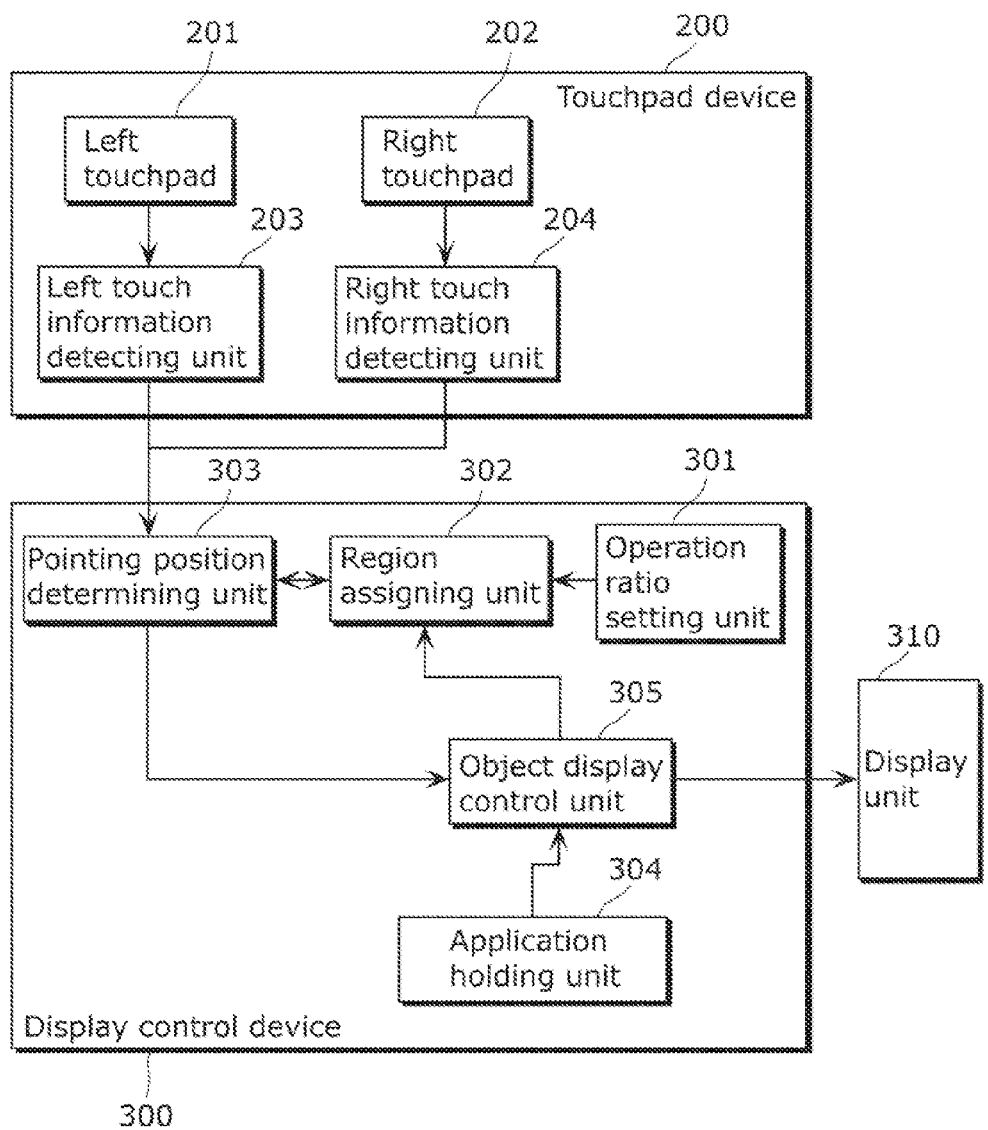

FIG. 10

| Index | Display X-axis Coordinate | Display Y-axis Coordinate | Display Width | Display Height |
|---|---|---|---|---|
| 001 (Window) | 100 | 50 | 1000 | 100 |
| 002 (A) | 100 | 200 | 100 | 100 |
| 003 (I) | 100 | 400 | 100 | 100 |
| 004 (Q) | 100 | 600 | 100 | 100 |
| 005 (Y) | 100 | 800 | 100 | 100 |
| 006 (B) | 300 | 200 | 100 | 100 |
| 007 (J) | 300 | 400 | 100 | 100 |
| 008 (R) | 300 | 600 | 100 | 100 |
| 009 (Z) | 300 | 800 | 100 | 100 |
| 010 (C) | 500 | 200 | 100 | 100 |
| 011 (K) | 500 | 400 | 100 | 100 |
| 012 (S) | 500 | 600 | 100 | 100 |
| 013 (?) | 500 | 800 | 50 | 100 |
| 014 (D) | 700 | 200 | 100 | 100 |
| 015 (L) | 700 | 400 | 100 | 100 |
| 016 (T) | 700 | 600 | 100 | 100 |
| 017 (E) | 900 | 200 | 100 | 100 |
| 018 (M) | 900 | 400 | 100 | 100 |
| 019 (U) | 900 | 600 | 100 | 100 |
| 020 (F) | 1100 | 200 | 100 | 100 |
| 021 (N) | 1100 | 400 | 100 | 100 |
| 022 (V) | 1100 | 600 | 100 | 100 |
| 023 (G) | 1300 | 200 | 100 | 100 |
| 024 (O) | 1300 | 400 | 100 | 100 |
| 025 (W) | 1300 | 600 | 100 | 100 |
| 026 (H) | 1500 | 200 | 100 | 100 |
| 027 (P) | 1500 | 400 | 100 | 100 |
| 028 (X) | 1500 | 600 | 100 | 100 |
| 029 (BS) | 1700 | 200 | 200 | 200 |

FIG. 13
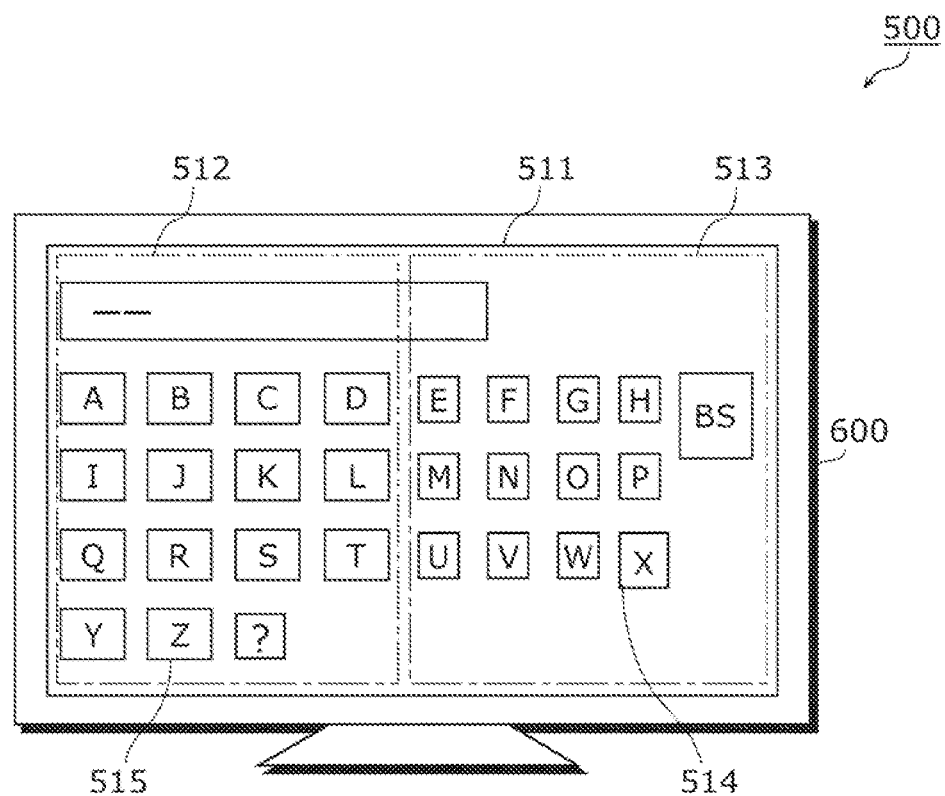
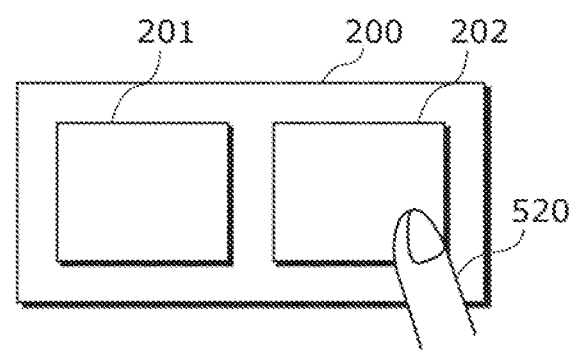

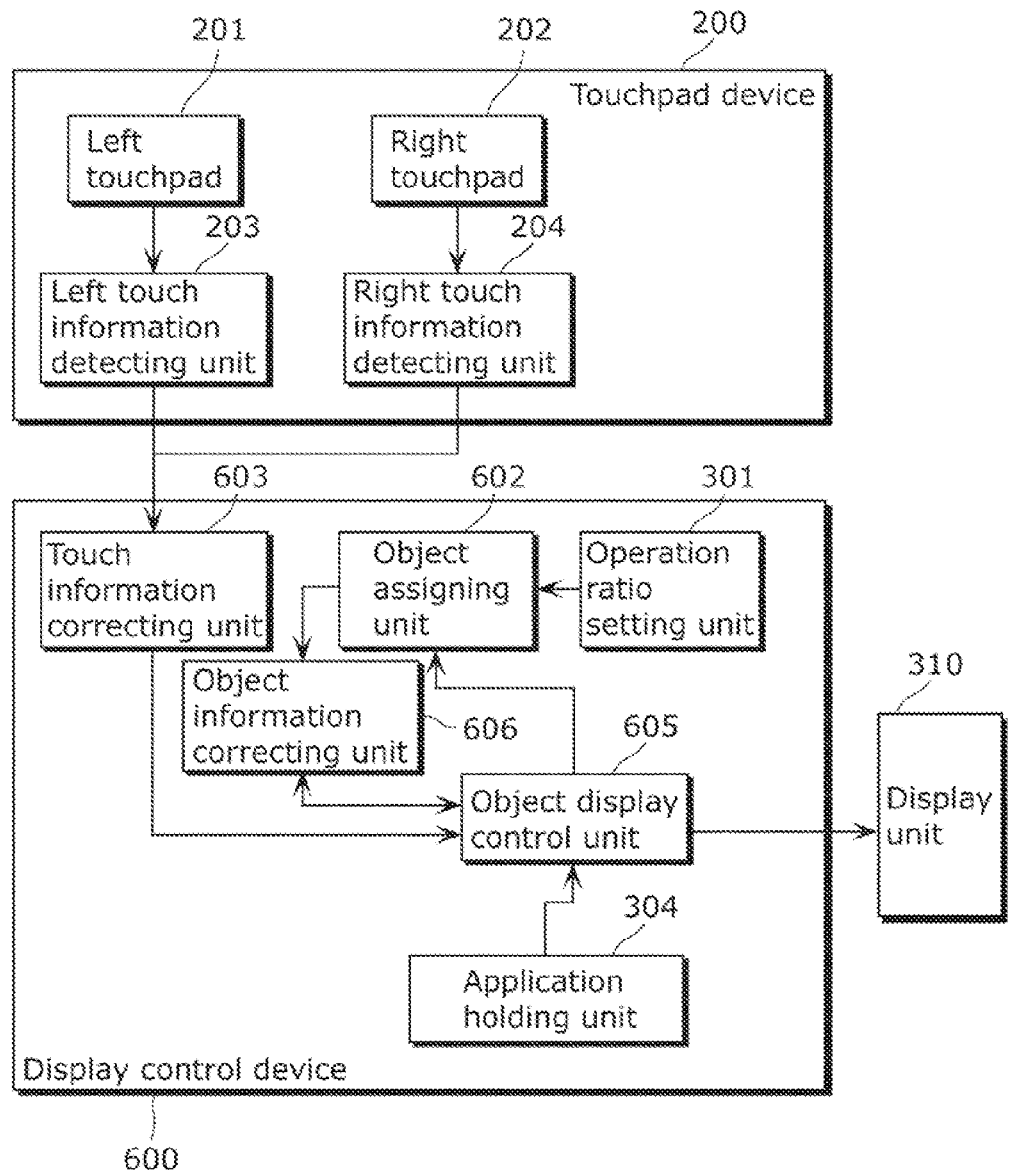

FIG. 22
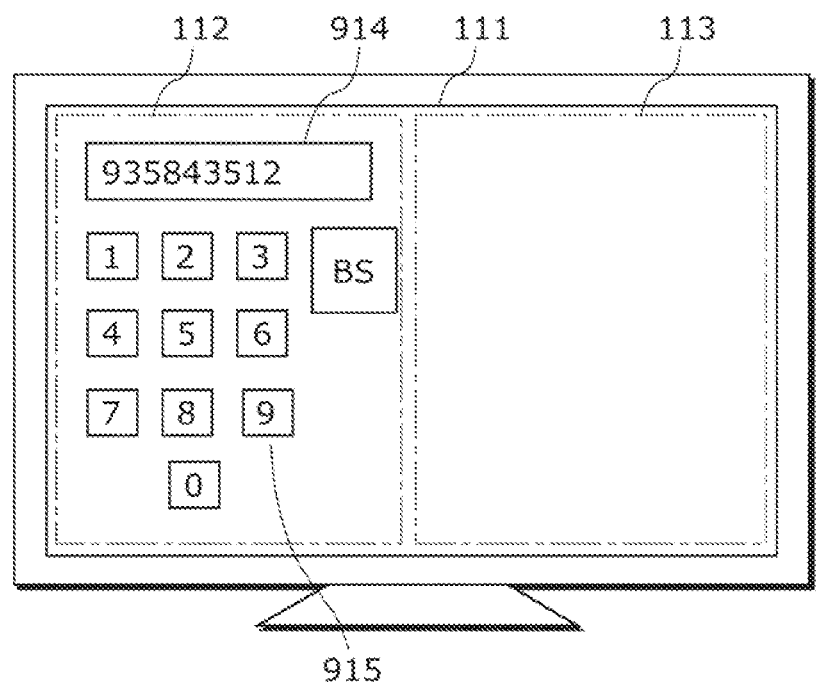
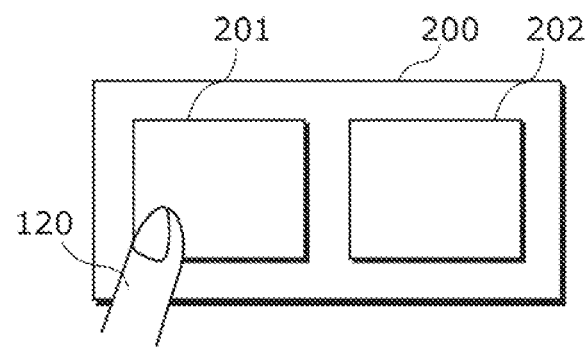

FIG. 23
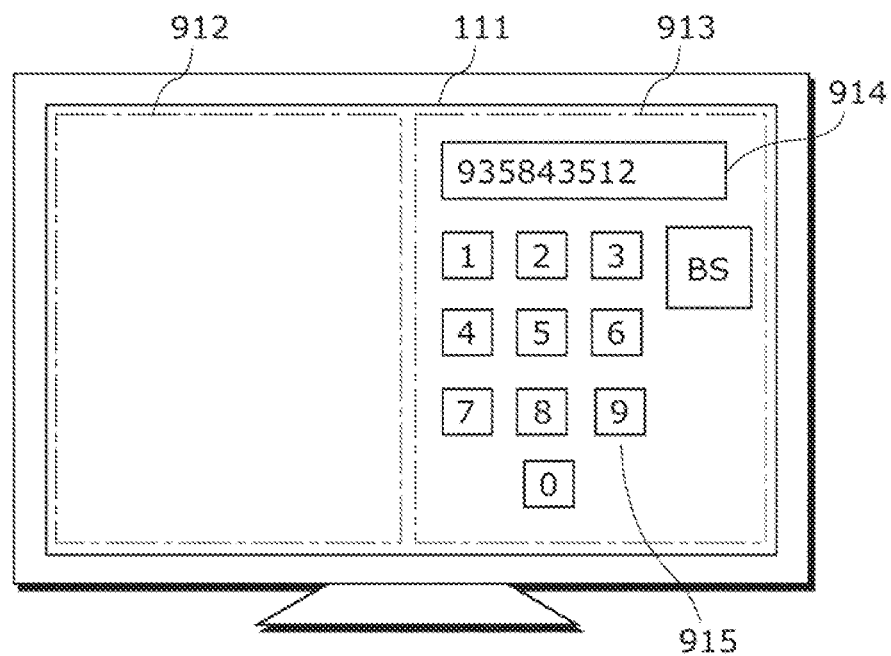
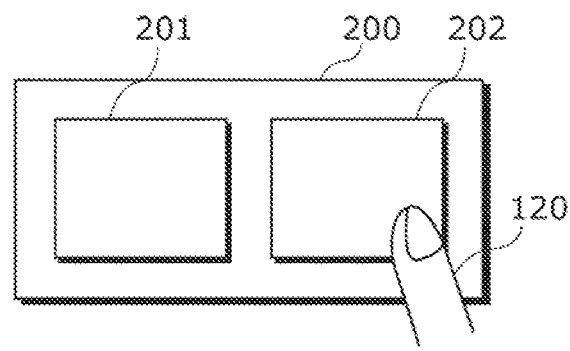

FIG. 24A

| Operated Touchpad ID | Designated Number | User Input | Necessary Time | Accuracy |
|---|---|---|---|---|
| 0 | 9 | 9 | 5 | Yes |
| 0 | 3 | 3 | 6 | Yes |
| 0 | 5 | 5 | 7 | Yes |
| 0 | 8 | 7 | 5 | No |
| 0 | 8 | 8 | 10 | Yes |
| 0 | 4 | 4 | 8 | Yes |
| 0 | 3 | 3 | 3 | Yes |
| 0 | 5 | 5 | 4 | Yes |
| 0 | 1 | 2 | 3 | No |
| 0 | 1 | 4 | 5 | No |
| 0 | 2 | 2 | 4 | Yes |

FIG. 24B

| Operated Touchpad ID | Designated Number | User Input | Necessary Time | Accuracy |
|---|---|---|---|---|
| 1 | 9 | 9 | 5 | Yes |
| 1 | 3 | 3 | 6 | Yes |
| 1 | 5 | 5 | 2 | Yes |
| 1 | 8 | 8 | 10 | Yes |
| 1 | 4 | 4 | 8 | Yes |
| 1 | 3 | 4 | 2 | No |
| 1 | 3 | 3 | 3 | Yes |
| 1 | 5 | 5 | 4 | Yes |
| 1 | 1 | 1 | 3 | Yes |
| 1 | 2 | 2 | 5 | Yes |
| 1 | 6 | 5 | 4 | Yes |
| 1 | 1 | 1 | 3 | Yes |
| 1 | 0 | 0 | 5 | Yes |

FIG. 27
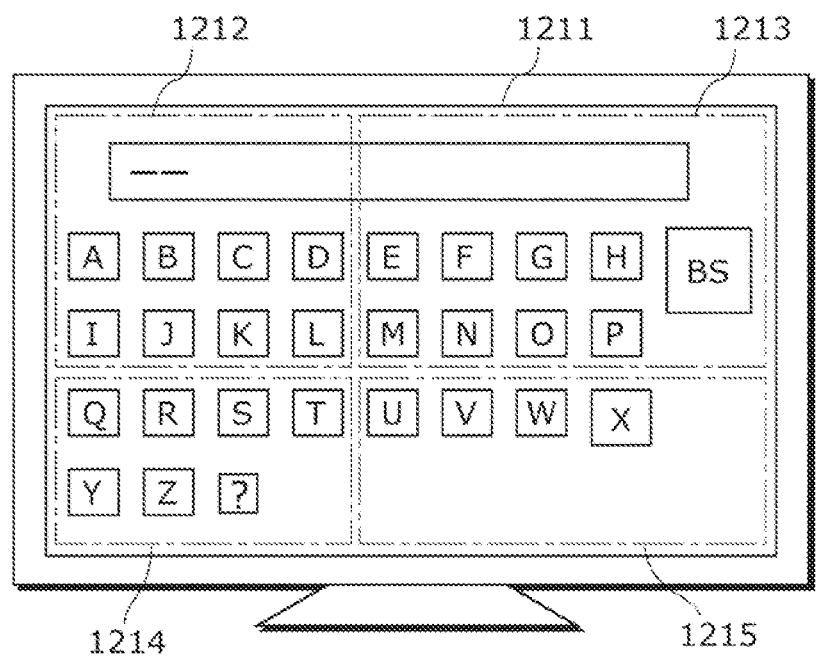
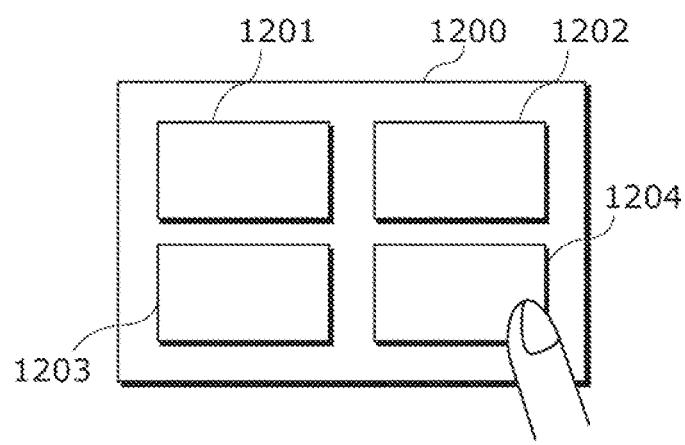

FIG. 28
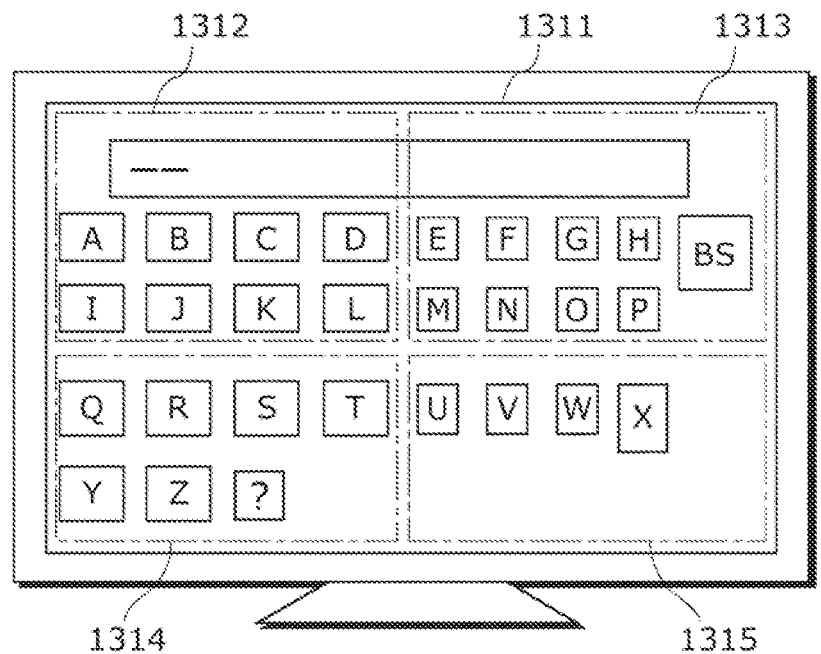
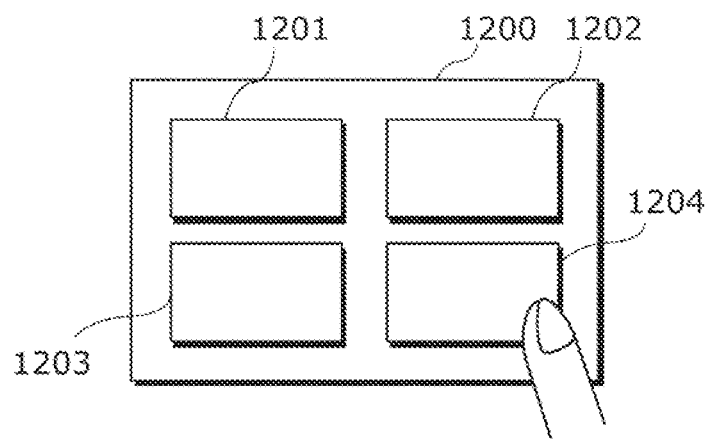

DISPLAY CONTROL DEVICE, DISPLAY CONTROL METHOD, AND TOUCHPAD INPUT SYSTEM

TECHNICAL FIELD

The present invention relates to a display control device, a display control method, and a touchpad input system which control, using touchpads, objects to be displayed on a screen.

BACKGROUND ART

Already publicly known is a technique of performing, using a touchpad or a touch panel, input operations for objects displayed on a screen. Changing the sizes of objects to be displayed on a screen facilitates the selection of the objects with the touchpads or the touch panels, and thus the operability of the touchpads or the touch panels can be increased by preventing wrong operations from occurring.

PTL 1 discloses, as a conventional technique, a technique of changing the sizes of objects to be displayed on a screen. The technique disclosed by PTL 1 allows an operator (user) to operate a touch panel while an object is being increased or decreased in size, detects, for the object, the minimum width X and height Y which enable the operation, and displays the object with optimum width X and height Y. Thus, the technique makes it possible to prevent the wrong operations on the touch panel from occurring.

CITATION LIST

Patent Literature

[PTL 1]
Japanese Unexamined Patent Application Publication No. 10-91226

SUMMARY OF INVENTION

Technical Problem

However, the conventional technique cannot sufficiently increase the operability.

For instance, there is an application which cannot change the number of objects to be displayed on a display screen. In such an application, there is a case where a lot of objects have been already placed on the display screen, and thus the sizes of the objects cannot be changed until the number of the objects is reduced. Thus, such a case has a problem that the operability cannot be increased.

Specifically, in the technique disclosed by PTL 1, when a lot of objects are placed on a display screen, the region of the display screen is a fixed region. For this reason, the number of the objects to be displayed on the display screen is reduced to change the sizes of the objects. Consequently, the technique disclosed by PTL 1 cannot change the sizes of the objects in the case of the application which cannot reduce the number of the objects, and thus cannot increase the operability.

It is conceivable to enlarge the screen or use screens to avoid changing the number of the objects. However, in either case, a problem of increasing power consumption or the like occurs.

The present invention has been conceived to solve the above problems. An object of the present invention is to provide a display control device, a display control method, and a touchpad input system which can increase the operability of touchpads without changing the number of objects to be displayed on a display screen.

Solution to Problem

In order to solve the conventional problems, a display control device according to one aspect of the present invention is a display control device which controls display of objects placed on a screen, based on inputs on touchpads by a user, the display control device including: an operation ratio setting unit configured to set an operation ratio indicating a ratio between operation capabilities of the user for the respective touchpads; an assigning unit configured to assign regions of the screen to the touchpads; a position-on-screen determining unit configured to determine a pointing position indicating a position on the screen, based on information indicating one of the assigned regions, the pointing position corresponding to a position of an input on one of the touchpads by the user; and a display control unit configured to control display of an object placed at the pointing position, wherein the assigning unit is configured to assign at least either the regions of the screen or the objects to the touchpads based on the operation ratio.

With this configuration, at least either the regions of the display screen or the objects are assigned to the touchpads according to the operation ratio set by the operation ratio setting unit, and thus the user can operate, among the touchpads, an easy-to-operate touchpad more frequently and more precisely, and a difficult-to-operate touchpad less frequency and less precisely. Moreover, the number of the objects placed on the display screen is not reduced in the assignment of the screen regions or the objects, and thus it is possible to increase the operability of the touchpads without changing the number of the objects to be displayed on the display screen. Furthermore, it is possible to prevent the power consumption from increasing, because it is not necessary to enlarge the display screen or use the screens.

Moreover, the objects are placed at predetermined positions on the screen, and the assigning unit may assign the regions of the screen to the touchpads so that larger one of the regions is assigned to one of the touchpads for which the user has a higher operation capability.

With this configuration, it is possible to increase the operation efficiency of the touchpads by changing the assignment of the regions without changing the positions of the objects. With this configuration, it is possible to increase the operation efficiency of the touchpads by changing the assignment of the regions, when the objects are placed at the fixed positions. For instance, assigning the larger region the touchpad that is easy to operate for the user allows the easy-to-operate touchpad to operate more objects. Moreover, assigning a smaller region to a touchpad that is difficult to operate for the user allows the difficult-to-operate touchpad to operate fewer objects.

For example, the assigning unit may determine the regions of the screen and assign the determined regions to the touchpads so that an area ratio between the regions is equal to the operation ratio.

With this configuration, assigning the larger region to the touchpad that is easy to operate for the user and the smaller region to the touchpad that is difficult to operate for the user increases the operation efficiency of the touchpads.

Moreover, the assigning unit may determine the regions of the screen and assign the determined regions to the touchpads so that a ratio between the numbers of objects in the respective regions is equal to the operation ratio.

With this configuration, assigning more objects to the touchpad that is easy to operate for the user and fewer objects to the touchpad that is difficult to operate for the user increases the operation efficiency of the touchpads.

Moreover, the assigning unit may determine the regions of the screen and assign the determined regions to the touchpads so that a ratio between sums of areas of objects in the respective regions is equal to the operation ratio.

With this configuration, assigning more objects to the touchpad that is easy to operate for the user and fewer objects to the touchpad that is difficult to operate for the user increases the operation efficiency of the touchpads.

Moreover, the assigning unit may determine the regions of the screen and assign the determined regions to the touchpads so that a ratio between operation probabilities is equal to the operation ratio, each of the operation probabilities being a probability of operating one of objects in the respective regions.

With this configuration, assigning objects frequently operated to the touchpad that is easy to operate for the user and objects less frequently operated to the touchpad that is difficult to operate for the user increases the operation efficiency of the touchpads.

Moreover, the assigning unit may determine the regions of the screen and assign the determined regions to the touchpads so that a reciprocal ratio between smallest areas is equal to the operation ratio, each of the smallest areas being a smallest area among areas of the objects in the respective regions and being relative to an area of a corresponding one of the regions.

With this configuration, assigning the smallest object to the touchpad that is easy to operate for the user increases the operation efficiency of the touchpads.

Moreover, the predetermined regions to be assigned to the touchpads are determined on the screen, the assigning unit may assign the objects to the touchpads based on the operation ratio, and the display control device further includes an object correcting unit configured to correct at least one of the objects so that the objects are placed in the regions assigned to the touchpads by the assigning unit.

With this configuration, it is possible to increase the operation efficiency of the touchpads by changing the assignment of the objects without changing the assignment of the regions. To put it differently, it is possible to increase the operation efficiency of the touchpads by changing the assignment of the objects, when the assignment between the regions of the screen and the touchpads is fixed. For instance, it is possible to assign more objects to the touchpad that is easy to operate for the user, and fewer objects to the touchpad that is difficult to operate for the user.

Moreover, the object correcting unit may correct at least one of a position, a size, an input-receiving position, and an input-receiving size of the at least one object.

With this configuration, it is possible to change at least one of the size and the position of the object, and thus it is possible to increase the operation efficiency by causing the difficult-to-operate touch to operate larger objects.

For instance, the assigning unit may assign the objects to the touchpads so that the number of objects assigned to each of the touchpads is equal to the number of objects in each of provisional regions that are regions obtained by provisionally assigning the screen so that an area ratio between the provisional regions is equal to the operation ratio.

With this configuration, for example, assigning more objects to the touchpad that is easy to operate for the user and fewer objects to the touchpad that is difficult to operate for the user increases the operation efficiency of the touchpads.

Moreover, the assigning unit may assign the objects to the touchpads so that a ratio between the numbers of the objects assigned to the respective touchpads is equal to the operation ratio.

With this configuration, assigning more objects to the touchpad that is easy to operate for the user and fewer objects to the touchpad that is difficult to operate for the user increases the operation efficiency of the touchpads.

Moreover, the assigning unit may assign the objects to the touchpads so that a ratio between sums of areas of the objects assigned to the respective touchpads is equal to the operation ratio.

With this configuration, assigning more objects to the touchpad that is easy to operate for the user and fewer objects to the touchpad that is difficult to operate for the user increases the operation efficiency of the touchpads.

Moreover, the assigning unit may assign the objects to the touchpads so that a ratio between operation probabilities is equal to the operation ratio, each of the operation probabilities being a probability of operating one of the objects assigned to the respective touchpads.

With this configuration, assigning objects frequently operated to the touchpad that is easy to operate for the user and objects less frequently operated to the touchpad that is difficult to operate for the user increases the operation efficiency of the touchpads.

Moreover, the assigning unit may assign the objects to the touchpads so that a reciprocal ratio between smallest areas is equal to the operation ratio, each of the smallest areas being a smallest area among areas of the objects assigned to the respective touchpads and being relative to an area of a corresponding one of the regions.

With this configuration, assigning the smallest object to the touchpad that is easy to operate for the user increases the operation efficiency of the touchpads.

Moreover, the operation ratio setting unit may calculate the ratio between the operation capabilities of the user for the respective touchpads based on an operation history of the touchpads by the user, and set the calculated ratio between the operation capabilities as the operation ratio.

With this configuration, it is possible to perform the assignment more suitable for the user by calculating the operation ratio based on the operation history, and thus it is possible to increase the operability of the touchpads.

For instance, the operation history indicates the number of inputs on each touchpad by the user in a given period of time, and the operation ratio setting unit may calculate, as the ratio between the operation capabilities, a ratio of the number of the inputs.

Moreover, the operation history indicates the number of wrong operations on each touchpad by the user, and the operation ratio setting unit may calculate, as the ratio between the operation capabilities, a reciprocal of a ratio of the number of the wrong operations.

Furthermore, the operation history indicates a necessary time for the user to make an input on each touchpad, and the operation ratio setting unit may calculate an average necessary time based on the operation history, and set, as the operation ratio, a reciprocal of a ratio of the calculated average necessary time, the average necessary time being an average value of necessary times to make the input.

Moreover, the operation history indicates a distance of a trajectory drawn by the time the user makes an input on each touchpad, and the operation ratio setting unit may calculate an average movement distance based on the operation history, and set, as the operation ratio, a reciprocal of a ratio of the calculated average movement distance, the average movement distance being an average value of distances of the trajectory drawn by the time the input is made.

Furthermore, the operation history indicates a necessary time for the user to make an input on each touchpad and a distance of a trajectory drawn by the time the user makes the input on each touchpad, and the operation ratio setting unit may calculate an average speed based on the operation history, and set, as the operation ratio, a ratio of the calculated average speed, the average speed being an average value of speeds of the trajectory by the time an input is made.

A touchpad input system according to another aspect of the present invention is a touchpad input system which receives inputs on touchpads by a user and controls display objects placed on a display screen based on the received inputs, the touchpad input system including: a touchpad device including the touchpads; a display device including the display screen; and a display control device which controls display of objects placed on the display screen, based on the inputs on the touchpads by the user, wherein the display control device includes: an operation ratio setting unit configured to set an operation ratio indicating a ratio between operation capabilities of the user for the respective touchpads; an assigning unit configured to assign regions of the display screen to the touchpads; a position-on-screen determining unit configured to determine a pointing position indicating a position on the display screen, based on information indicating one of the assigned regions, the pointing position corresponding to a position of an input on one of the touchpads by the user; and a display control unit configured to control display of an object placed at the pointing position, and the assigning unit is configured to assign at least either the regions of the display screen or the objects to the touchpads based on the operation ratio.

It is to be noted that the present invention can be realized not only as the display control device and the touchpad input system but also as a method having, as steps, the processing units included in the display control device. Moreover, the present invention may be realized as a program causing a computer to execute the steps. Furthermore, the present invention may be realized as a recording medium having the program recorded thereon such as a computer-readable CD-ROM (Compact Disc-Read Only Memory, and information, data, or signals indicating the program. The program, the information, the data, and the signals may be distributed via a communication network such as the Internet.

Moreover, part or all of the constituent elements in the display control device may be configured of one system LSI (Large Scale Integration). A system LSI is a super-multifunctional LSI manufactured by integrating components on one chip and is, specifically, a computer system including a micro processing unit, a ROM, a RAM (Random Access Memory), and so on.

Advantageous Effects of Invention

The display control device, the display control method, and the touchpad input system according to the one aspect of the present invention can increase the touchpad operability without changing the number of the objects to be displayed on the display screen.

BRIEF DESCRIPTION OF DRAWINGS

FIG. 1 is a diagram schematically showing a touchpad input system according to Embodiment 1 of the present invention.

FIG. 2 is a block diagram showing configuration examples of a touchpad device and a display control device according to Embodiment 1 of the present invention.

FIG. 3 is a diagram illustratively showing an example of a data structure of position-on-touchpad information generated by a touch information detecting unit according to Embodiment 1 of the present invention.

FIG. 10 is a diagram illustratively showing an example of a data structure of an object information list according to Embodiment 1 of the present invention.

FIG. 13 is a diagram schematically showing a touchpad input system according to Embodiment 2 of the present invention.

FIG. 14 is a block diagram showing configuration examples of a touchpad device and a display control device according to Embodiment 2 of the present invention.

FIG. 15 is a diagram illustratively showing an example of a data structure of object assignment information generated by an object assigning unit according to Embodiment 2 of the present invention.

FIG. 22 is a diagram showing an example of an operation ratio calculation application according to Embodiment 3 of the present invention.

FIG. 23 is a diagram showing another example of the operation ratio calculation application according to Embodiment 3 of the present invention.

FIG. 24A is a diagram illustratively showing an example of a data structure of an operation history according to Embodiment 3 of the present invention.

FIG. 24B is a diagram illustratively showing an example of a data structure of an operation history according to Embodiment 3 of the present invention.

FIG. 27 is a diagram schematically showing a touchpad input system according to a modification of an embodiment of the present invention.

FIG. 28 is a diagram schematically showing a touchpad input system according to a modification of an embodiment of the present invention.

DESCRIPTION OF EMBODIMENTS

Figure 4:
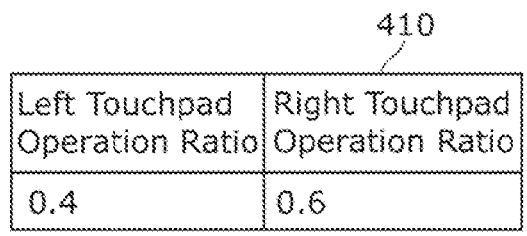
FIG. 4 is a diagram illustratively showing an example of a data structure of operation ratio information generated by an operation ratio setting unit according to Embodiment 1 of the present invention.

The following describes embodiments of the present invention with reference to the drawings.

Embodiment 1

A display control device according to Embodiment 1 of the present invention is characterized by assigning regions of a display screen to touchpads based on an operation ratio indicating a ratio between operation capabilities of the user for the respective touchpads. Specifically, the display control device according to Embodiment 1 of the present invention is characterized by determining the regions of the display screen and assigning the determined regions to the touchpads so that larger one of the regions is assigned to one of the touchpads for which the user has a higher operation capability.

FIG. 1 is a diagram schematically showing a touchpad input system 100 according to Embodiment 1 of the present invention. The touchpad input system 100 includes a touchpad device 200 and a display control device 300.

A display screen 111 is an example of a display screen on which objects (objects 114, 115, and so on) are placed. The objects (objects 114 and 115) are placed at predetermined positions. In other words, the positions of the objects on the display screen 111 are fixed.

The touchpad device 200 includes a left touchpad 201 and a right touchpad 202.

The left touchpad 201 and the right touchpad 202 each are defined by a touchpad region associated with a screen region of the display screen 111, using absolute coordinates. In this embodiment, the touchpad region of the left touchpad 201 is associated with a left touchpad operation region 112 of the display screen 111. Moreover, the touchpad region of the right touchpad 202 is associated with a right touchpad operation region 113 of the display screen 111.

For instance, the top left corner and the bottom right corner of the left touchpad 201 are mapped to those of the left touchpad operation region 112, respectively. It is to be noted that the same applies to the top right corner and the bottom left corner of the left touchpad 201. Objects in the range of the left touchpad operation region 112, e.g. the object 115, are operated with the left touchpad 201.

Similarly, the top left corner and the bottom right corner of the right touchpad 202 are mapped to those of the right touchpad operation region 113, respectively. It is to be noted that the same applies to the top right corner and the bottom left corner of the right touchpad 202. Objects in the range of the right touchpad operation region 113, e.g. the object 114, are operated with the right touchpad 202.

When a finger 120 touches the right touchpad 202, the touchpad device 200 generates position-on-touchpad information, using position information about a position in the touchpad region of the right touchpad 202, that is, information about an X-axis coordinate and a Y-axis coordinate. The touchpad device 200 transmits the generated position-on-touchpad information to the display control device 300.

The left touchpad 201 and the right touchpad 202 each are defined by the touchpad region associated with the screen region of the display screen 111, using the absolute coordinates. The display control device 300 calculates, using position information about a position in a touchpad region, corresponding position information about a position in the right touchpad operation region 113 of the display screen 111, that is, an X-axis coordinate and a Y-axis coordinate. Then, the display control device 300 changes the display color or display size of the object 114 on a corresponding coordinate of the display screen 111, and thus presents to a user that a pointing position, corresponding to an input on the touchpad with the finger 120, on the display screen 111 is over the object 114.

It is to be noted that the technique of detecting which part of the touchpad device 200 is touched with the finger 120 by using electrostatic touchpads as touchpads (the left touchpad 201 and the right touchpad 202) in the touchpad device 200 is publicly known, and thus a description thereof is omitted.

FIG. 2 is a block diagram showing configuration examples of the touchpad device 200 and the display control device 300 according to Embodiment 1 of the present invention.

The touchpad device 200 includes touchpads, and receives an input from the user. As shown in FIG. 2, the touchpad device 200 includes the left touchpad 201, the right touchpad 202, a left touch information detecting unit 203, and a right touch information detecting unit 204.

The display control device 300 controls display of objects placed on the display screen 111, based on inputs on the touchpads (the left touchpad 201 and the right touchpad 202) by the user. As shown in FIG. 2, the display control device 300 includes an operation ratio setting unit 301, a region assigning unit 302, a pointing position determining unit 303, an application holding unit 304, and an object display control unit 305.

A display unit 310 has the display screen 111. It is to be noted that, as shown in FIG. 1, the display control device 300 may include the display unit 310.

The left touch information detecting unit 203 generates touch information indicating an input on the left touchpad 201 by the user. The touch information is information indicating at least a position of an input by the user. Specifically, the left touch information detecting unit 203 receives the touchpad input of the user from the left touchpad 201, and notifies the pointing position determining unit 303 of information in which a position of a touch on the left touchpad 201 by the user is expressed with an X-axis coordinate and a Y-axis coordinate, as position-on-touchpad information.

The right touch information detecting unit 204 generates touch information indicating an input on the right touchpad 202 by the user. The touch information is information indicating at least a position of an input by the user. Specifically, the right touch information detecting unit 204 receives the touchpad input of the user from the right touchpad 202, and notifies the pointing position determining unit 303 of information in which a position of a touch on the right touchpad 202 by the user is expressed with an X-axis coordinate and a Y-axis coordinate, as position-on-touchpad information.

The operation ratio setting unit 301 sets an operation ratio indicating a ratio between operation capabilities of the user for the respective touchpads. Specifically, the operation ratio setting unit 301 sets the operation ratio between the left touchpad 201 and the right touchpad 202 based on touchpad operation setting information from the user, and notifies the region assigning unit 302 of the set operation ratio as operation ratio information.

For example, a dominant hand of the user is input as the touchpad operation setting information, and when the dominant hand is the right hand, a "left touchpad operation ratio" and a "right touchpad operation ratio" are set to "0.4" and "0.6", respectively. Conversely, when the dominant hand is the left hand, it is possible to conceive a method of setting the "left touchpad operation ratio" and the "right touchpad operation ratio" to "0.6" and "0.4", respectively.

Moreover, for instance, the user may be asked to input, as numeric values, a level of difference in operation capabilities of the left and right hands, and values proportional to the input numeric values may be set as respective operation ratios of the touchpads. When the user inputs, for example, "1.0" for the left hand and "1.2" for the right hand, it is possible to conceive a method of setting the "left touchpad operation ratio" and the "right touchpad operation ratio" to "0.45" and "0.55", respectively.

The region assigning unit 302 is an example of an assigning unit according to the present invention, and assigns at least either the objects or the regions of the display screen 111 to the touchpads based on the operation ratio. For instance, the region assigning unit 302 assigns the regions of the display screen 111 to the touchpads based on the operation ratio so that, among the touchpads, a touchpad with a higher operation capability of the user has more objects as operation objects.

Specifically, the region assigning unit 302 determines the regions of the display screen 111 based on the operation ratio and assigns the determined regions to the touchpads so that, among the regions, a larger region is assigned to the touchpad with the higher operation capability of the user. In this embodiment, the region assigning unit 302 divides the display screen 111 into the regions based on the operation ratio, and assigns the divided regions to the touchpads. For example, when the user is right-handed and has a higher operation capability for the right touchpad 202 than the left touchpad 201, the right touchpad operation region 113 is larger than the left touchpad operation region 112.

More specifically, the region assigning unit 302 determines, using the notified operation ratio information, how the display screen 111 is divided into the left touchpad operation region 112 and the right touchpad operation region 113. As an example, the region assigning unit 302 determines the regions of the display screen 111 and assigns the determined regions to the touchpads so that an area ratio between the regions is equal to the operation ratio.

Specifically, the region assigning unit 302 divides the display screen 111 into the regions so that the area ratio between the regions obtained through the division of the display screen 111 is equal to the operation ratio. Then, the region assigning unit 302 notifies the pointing position determining unit 303 of region assignment information indicating the assignment result. The region assignment information is, for example, information in which the left touchpad operation region 112 corresponding to the left touchpad 201 and the right touchpad operation region 113 corresponding to the right touchpad 202 on the display screen 111 each are expressed with an X-axis coordinate and a Y-axis coordinate.

It is to be noted that the operation ratio may not necessarily match the area ratio. The region assigning unit 302 may assign the regions so that a region having a larger area is assigned to a touchpad having a higher operation capability.

The pointing position determining unit 303 is an example of a position-on-screen determining unit according to the present invention, and determines a pointing position based on information (region assignment information) indicating the assigned regions. It is to be noted that the pointing position indicates a position on the display screen 111 corresponding to the position of an input on one of the touchpads by the user.

For instance, the pointing position determining unit 303 determines a pointing position on the display screen 111 based on position-on-touchpad information notified by the left touch information detecting unit 203 or the right touch information detecting unit 204, and notifies the object display control unit 305 of the determined pointing position on the display screen 111 as pointing position information.

The application holding unit 304 holds at least one application, and transfers an application to be executed to the object display control unit 305. Here, the application is, for instance, a text document described in a markup language such as HTML and XML or a script language such as JavaScript™. It is assumed that the application includes, for example, position information for displaying objects on the display screen 111 or process operation information at the time when the objects are focused or selected. It is to be noted that applications are not limited to the application.

The object display control unit 305 controls the display of an object placed at the pointing position indicated by the pointing position information.

Specifically, the object display control unit 305 first obtains an application to be executed from the application holding unit 304. Then, the object display control unit 305 parses the obtained application, and obtains position information of the object and process operation information at the time when the objects are focused or selected.

Next, the object display control unit 305 instructs the display of the object according to the obtained position information. Alternatively, the object display control unit 305 determines, among the objects, an object that is pointed, based on the pointing position information notified by the pointing position determining unit 303, and executes a corresponding process operation. Such a technique is publicly known as a technique of reading and parsing a HTML text to display objects or executing a script when focus is given, in a web browser or the like, and thus a description thereof is omitted.

The display unit 310 displays the object on the display screen 111 according to the instruction from the object display control unit 305.

FIG. 3 is a diagram showing an example of position-on-touchpad information of which the left touch information detecting unit 203 or the right touch information detecting unit 204 notifies the pointing position determining unit 303 according to Embodiment 1 of the present invention. Position-on-touchpad information 400 shown in FIG. 3 includes "Input Touchpad ID", "X-axis Coordinate on Touchpad", and "Y-axis Coordinate on Touchpad".

The "Input Touchpad ID" is an identifier for identifying which touchpad is touched among the touchpads (the left touchpad 201 and the right touchpad 202) included in the touchpad device 200. The "X-axis Coordinate on Touchpad" and the "Y-axis Coordinate on Touchpad" are an X-axis coordinate and a Y-axis coordinate for position-on-touchpad information for indicating which part on the touchpad is touched, respectively. For instance, 0 is assigned to an X-axis coordinate and a Y-axis coordinate at the top left corner of the touchpad, and the predetermined largest value is assigned to each of an X-axis coordinate and a Y-axis coordinate at the bottom right corner of the touchpad. Each of the "X-axis Coordinate on Touchpad" and the "Y-axis Coordinate on Touchpad" is a value in the range of 0 to the largest value, and indicates which region of the touchpad is touched.

Here, as an example, it is assumed that an "Input Touchpad ID" in the position-on-touchpad information 400 notified to the pointing position determining unit 303 by the left touch information detecting unit 203 indicates "0", that is, the identifier of the left touchpad 201 indicates "0". Moreover, it is assumed that an "Input Touchpad ID" in the position-on-touchpad information 400 notified to the pointing position determining unit 303 by the right touch information detecting unit 204 indicates "1", that is, the identifier of the right touchpad 202 indicates "1".

It is to be noted that the position-on-touchpad information 400 may include the large value of each of the "X-axis Coordinate on Touchpad" and the "Y-axis Coordinate on Touchpad".

FIG. 4 is a diagram showing an example of operation ratio information of which the operation ratio setting unit 301 notifies the region assigning unit 302 according to Embodiment 1 of the present invention. Operation ratio information 410 shown in FIG. 4 includes "Left Touchpad Operation Ratio" and "Right Touchpad Operation Ratio".

The "Left Touchpad Operation Ratio" is an operation ratio of the left touchpad 201, and the "Right Touchpad Operation Ratio" is an operation ratio of the right touchpad 202. A higher ratio indicates a higher operation capability of the user.

Figure 5:
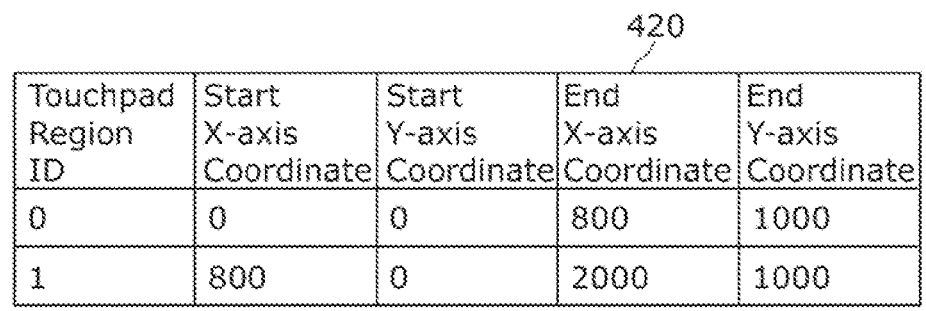
FIG. 5 is a diagram illustratively showing an example of a data structure of region assignment information generated by a region assigning unit according to Embodiment 1 of the present invention.

FIG. 5 is a diagram showing an example of region assignment information of which the region assigning unit 302 notifies the pointing position determining unit 303 according to Embodiment 1 of the present invention. Region assignment information 420 shown in FIG. 5 includes "Touchpad Region ID", "Start X-axis Coordinate", "Start Y-axis Coordinate", "End X-axis Coordinate", and "End Y-axis Coordinate".

The "Touchpad Region ID" is an identifier indicating which touchpad region information belongs to. The "Start X-axis Coordinate" and the "Start Y-axis Coordinate" are an X-axis coordinate and a Y-axis coordinate for a region start position on the display screen 111 at which a region of the touchpad is corresponded to a region of the display screen 111, respectively. The "End X-axis Coordinate" and the "End Y-axis Coordinate" are an X-axis coordinate and a Y-axis coordinate for a region end position on the display screen 111 at which the region of the touchpad is corresponded to the region of the display screen 111, respectively. Here, as an example, the "Touchpad Region ID" of the left touchpad 201 indicates "0", and the "Touchpad Region ID" of the right touchpad 202 indicates "1".

Figure 6:
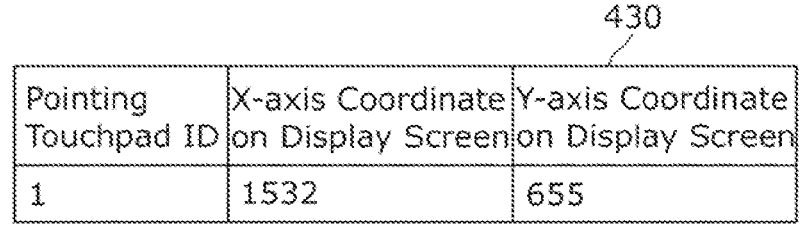
FIG. 6 is a diagram illustratively showing an example of a data structure of pointing position information generated by a pointing position determining unit according to Embodiment 1 of the present invention.

FIG. 6 is a diagram showing an example of pointing-position-on-display information of which the pointing position determining unit 303 notifies the object display control unit 305 according to Embodiment 1 of the present invention. Pointing position information 430 shown in FIG. 6 includes "Pointing Touchpad ID", "X-axis Coordinate on Display Screen", and "Y-axis Coordinate on Display Screen".

The "Pointing Touchpad ID" is an identifier indicating which touchpad pointing position information corresponds to. The "X-axis Coordinate on Display Screen" and the "Y-axis Coordinate on Display Screen" are an X-axis coordinate and a Y-axis coordinate on the display screen 111, respectively, which correspond to the "X-axis Coordinate on Touchpad" and the "Y-axis Coordinate on Touchpad" in the position-on-touchpad information 400.

The following describes operations of the touchpad input system 100 according to Embodiment 1 of the present invention.

Figure 7:
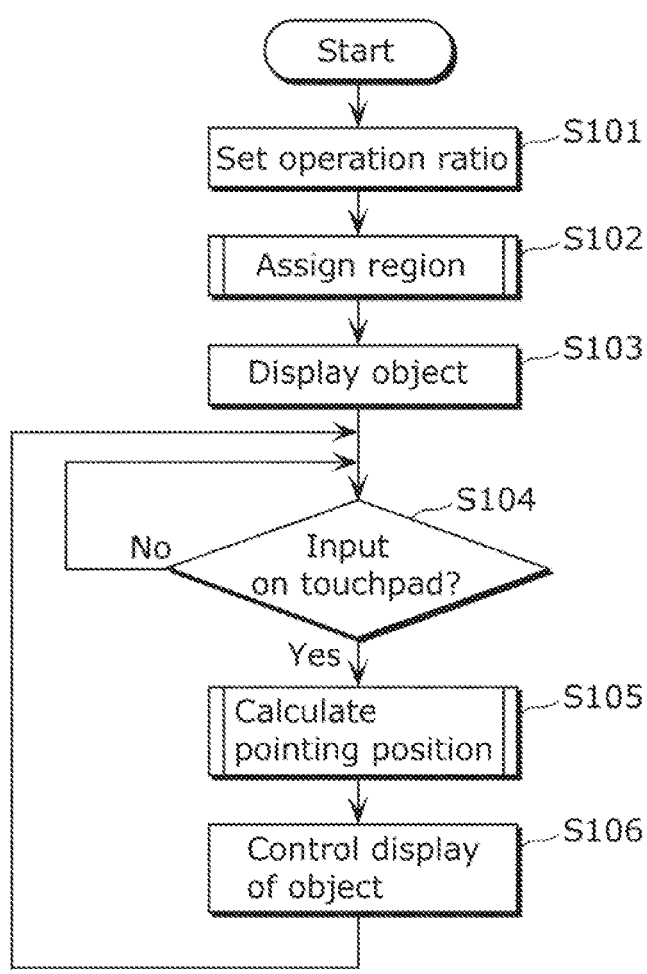
FIG. 7 is a flowchart showing an example of a procedure in which the touchpad input system according to Embodiment 1 of the present invention applies an input on the touchpad device to screen display.

FIG. 7 is a flowchart showing an example of a procedure in which the touchpad input system 100 according to Embodiment 1 of the present invention applies, to screen display, an input to the touchpad device 200. The following describes in detail processes in Embodiment 1 of the present invention with reference to FIG. 7. It is to be noted that, hereinafter, a case is described where two regions of the display screen 111 are assigned to two touchpads.

First, the operation ratio setting unit 301 sets an operation ratio between the left touchpad 201 and the right touchpad 202 based on touchpad operation setting information, and notifies the region assigning unit 302 of the set operation ratio as operation ratio information 410 (Step S101). For instance, the operation ratio setting unit 301 causes the user to input information indicating the user's dominant hand. When the input dominant hand is the right hand, the operation ratio setting unit 301 sets the "Left Touchpad Operation Ratio" and the "Right Touchpad Operation Ratio" to "0.4" and "0.6", respectively, to generate the operation ratio information 410.

Next, the region assigning unit 302 determines two regions of the display screen 111 using the notified operation ratio information 410, and assigns, as a left touchpad operation region 112 and a right touchpad operation region 113, the determined two regions to the two touchpads (Step S102). Specifically, the region assigning unit 302 determines a dividing position for the display screen 111 using the notified operation ratio information 410, and divides the display screen 111 into the left touchpad operation region 112 and the right touchpad operation region 113. Then, the region assigning unit 302 notifies the pointing position determining unit 303 of region assignment information 420.

The following describes in detail a region assignment method.

In this embodiment, the display screen 111 is divided into two regions, and each of the regions is assigned to one of the two touchpads including the left touchpad and the right touchpad. Moreover, since the touchpads are placed side by side, the display screen 111 is divided into a left portion and a right portion. In other words, the display screen 111 is divided into a left side and a right side along a straight line in the Y-axis direction, and the left region and the right region resulting from the division are assigned to the two touchpads.

In this embodiment, the operation ratio information 410 is used for assignment using an area ratio between the left touchpad operation region 112 and the right touchpad operation region 113. A case is assumed where, for example, the user holds the touchpad device 200 with both hands, operates the left touchpad 201 with a finger (thumb) of the left hand, and operates the right touchpad 202 with a finger (thumb) of the right hand. The regions of the display screen 111 are assigned so that an operation region having a larger area is assigned to one of the touchpads which is operated with one of the hands (e.g. the dominant hand) which has a higher operation capability.

Figure 8:
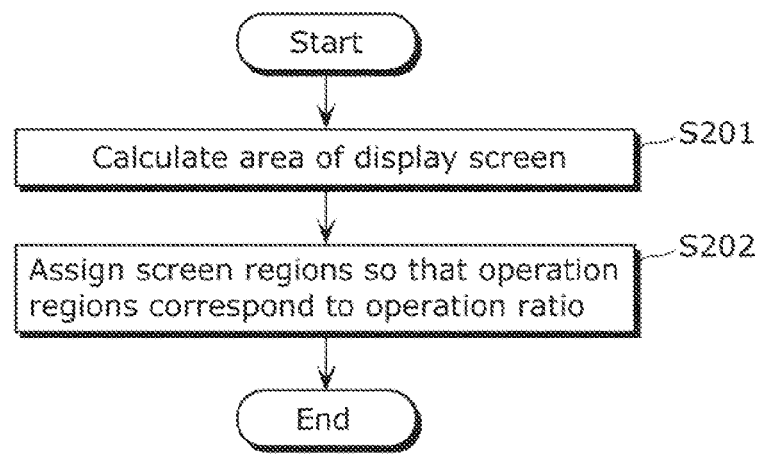
FIG. 8 is a flowchart showing an example of a procedure in which the region assigning unit assigns regions in the touchpad input system according to Embodiment 1 of the present invention.

FIG. 8 is a flowchart showing an example of a procedure in which the region assigning unit 302 according to Embodiment 1 of the present invention assigns regions, using an area ratio between the left touchpad operation region 112 and the right touchpad operation region 113.

First, the region assigning unit 302 calculates an area of the display screen 111 (Step S201). Then, the region assigning unit 302 assigns the screen regions of the display screen 111 so that the area ratio between the left touchpad operation region 112 and the right touchpad operation region 113 is equal to a ratio between the left touchpad operation ratio and the right touchpad operation ratio in the operation ratio information 410 (Step S202).

For instance, a case is assumed where the operation ratio information indicates that the "Left Touchpad Operation Ratio" and the "Right Touchpad Operation Ratio" are "0.4" and "0.6", respectively, and an X-axis coordinate and a Y-axis coordinate on the display screen 111 range from 0 to 2000 and 0 to 1000, respectively. In this case, the region assigning unit 302 notifies the pointing position determining unit 303 of the region assignment information 420 indicating that the X-axis coordinate from 0 to 800 defines the left touchpad operation region 112 and the X-axis coordinate from 800 to 2000 defines the right touchpad operation region 113.

Figure 29:
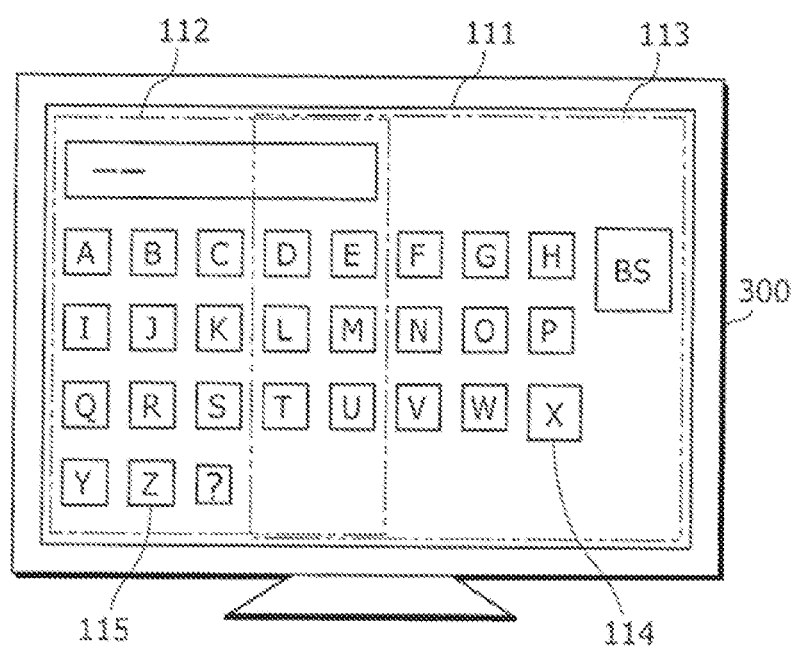
FIG. 29 is a diagram showing an example of assignment of a display screen according to a modification of an embodiment of the present invention.

It is to be noted that, in the previous example, although the left touchpad operation region 112 and the right touchpad operation region 113 are assigned so that there is no overlapping region between the left touchpad operation region 112 and the right touchpad operation region 113, the left touchpad operation region 112 and the right touchpad operation region 113 may be assigned so that part having a given area of the left touchpad operation region 112 overlaps with that of the right touchpad operation region 113. For example, the regions of the display screen 111 may be assigned so that, as shown in FIG. 29, the X-axis coordinate from 0 to 900 defines the left touchpad operation region 112 and the X-axis coordinate from 700 to 2000 defines the right touchpad operation region 113.

As stated above, the region assigning unit 302 according to this embodiment determines the regions of the display screen 111 and assigns the determined regions to the touchpads so that the operation ratio matches the area ratio between the regions. It is to be noted that the operation ratio may not necessarily match the area ratio. The region assigning unit 302 may assign the region having the larger area to the touchpad having the higher operation capability.

Next, referring back to FIG. 7, the object display control unit 305 causes the display unit 310 to display objects (Step S103). Specifically, the object display control unit 305 obtains an application to be executed from the application holding unit 304, parses the obtained application, and obtains position information of each object. Then, the object display control unit 305 instructs the display unit 310 to display the objects. Consequently, the objects are displayed on the display screen 111.

It is to be noted that such a process is publicly known as the technique of reading and parsing a HTML text to display objects or executing a script when focus is given, in a web browser or the like, and thus a description thereof is omitted.

Next, the pointing position determining unit 303 judges whether or not there is an input on at least one of the left touchpad 201 and the right touchpad 202 by the user (Step S104). Specifically, the pointing position determining unit 303 judges whether or not to receive touch information (position-on-touchpad information) from the left touch information detecting unit 203 or the right touch information detecting unit 204 of the touchpad device 200.

When receiving the position-on-touchpad information, the pointing position determining unit 303 judges that there is the input on one of the left touchpad 201 and the right touchpad 202 by the user. When not receiving the position-on-touchpad information, the pointing position determining unit 303 judges that there is no input on both of the left touchpad 201 and the right touchpad 202 by the user.

When there is no input on both of the left touchpad 201 and the right touchpad 202 by the user (No in Step S104), the pointing position determining unit 303 waits for one of the left touchpad 201 and the right touchpad 202 to receive an input from the user (return to Step S104).

When there is the input on one of the left touchpad 201 and the right touchpad 202 by the user (Yes in Step S104), the pointing position determining unit 303 calculates pointing position information 430 about a pointing position on the display screen 111 based on the region assignment information 420 and the position-on-touchpad information 400, and notifies the object display control unit 305 of the calculated pointing position information 430 (Step S105).

The following describes in detail a procedure for calculating pointing position information.

Figure 9:
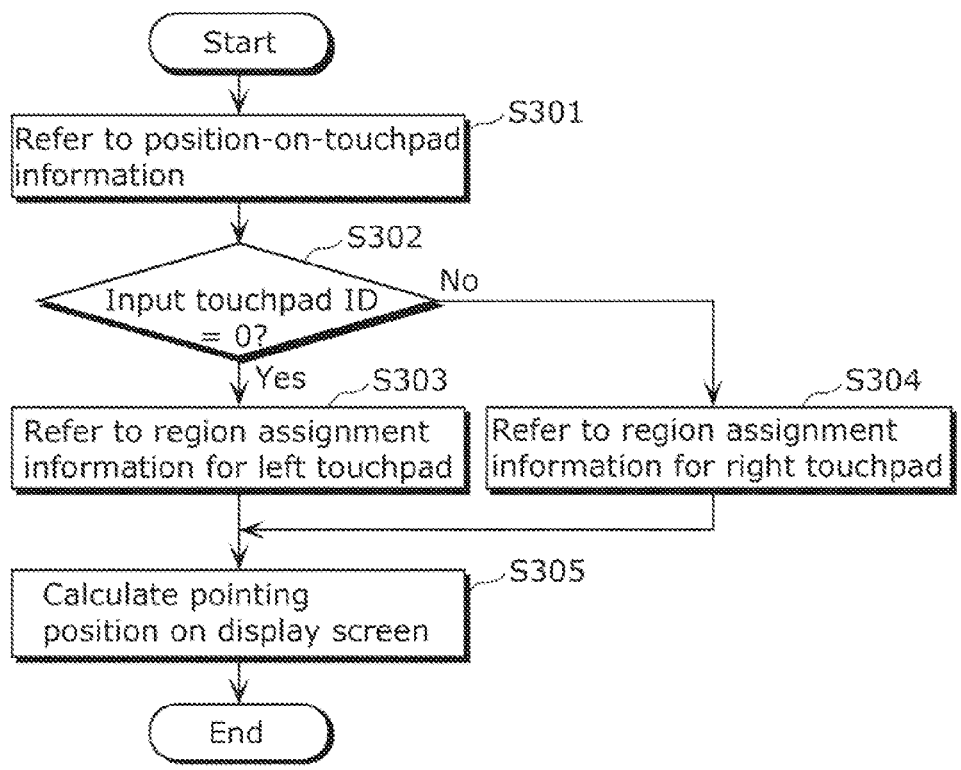
FIG. 9 is a flowchart showing an example of a procedure in which the pointing position determining unit calculates pointing-position-on-display-screen information in the touchpad input system according to Embodiment 1 of the present invention.

FIG. 9 is a flowchart showing an example of a procedure in which the pointing position determining unit 303 according to Embodiment 1 of the present invention calculates the pointing position information 430 about the pointing position on the display screen 111.

The pointing position determining unit 303 refers to the position-on-touchpad information 400 notified by the left touch information detecting unit 203 or the right touch information detecting unit 204 (Step S301).

Next, the pointing position determining unit 303 judges whether or not an "Input Touchpad ID" in the position-on-touchpad information 400 is 0 (Step S302). In other words, the pointing position determining unit 303 judges whether or not the touchpad receiving the input from the user is the left touchpad 201.

When the "Input Touchpad ID" is "0", that is, when the left touchpad 201 receives the input from the user (Yes in Step S302), the pointing position determining unit 303 refers to region assignment information of the left touchpad 201 (Step S303). Here, the region assignment information of the left touchpad 201 includes the "Start X-axis Coordinate", the "Start Y-axis Coordinate", the "End X-axis Coordinate", and the "End Y-axis Coordinate" corresponding to the "Touchpad Region ID" indicating "0", in the region assignment information 420.

When the "Input Touchpad ID" is "1", that is, when the right touchpad 202 receives the input from the user (No in Step S302), the pointing position determining unit 303 refers to region assignment information of the right touchpad 202 (Step S304). Here, the region assignment information of the right touchpad 202 includes the "Start X-axis Coordinate", the "Start Y-axis Coordinate", the "End X-axis Coordinate", and the "End Y-axis Coordinate" corresponding to the "Touchpad Region ID" indicating "1", in the region assignment information 420.

Next, the pointing position determining unit 303 calculates the pointing position information 430 about the pointing position on the display screen 111 (Step S305). An X-axis coordinate in the pointing position information 430 can be calculated according to (Equation 1).

(X-axis coordinate in pointing position information 430)={(end X-axis coordinate−start X-axis coordinate)×(X-axis coordinate on touchpad in position-on-touchpad information 400)/(maximum value of X-axis coordinate on touchpad)}+(start X-axis coordinate)  (Equation 1)

A Y-axis coordinate in the pointing position information 430 can be calculated according to (Equation 2).

(Y-axis coordinate in pointing position information 430)={(end Y-axis coordinate−start Y-axis coordinate)×(Y-axis coordinate on touchpad in position-on-touchpad information 400)/(maximum value of Y-axis coordinate on touchpad)}+(start Y-axis coordinate)  (Equation 2)

It is to be noted that the maximum values of the X-axis coordinate on touchpad and the Y-axis coordinate on touchpad may be included in the position-on-touchpad information 400 or may be held in an internal memory in the pointing position determining unit 303.

A case is assumed where, for instance, there is an input on the right touchpad 202 by the user and an X-axis coordinate and a Y-axis coordinate are 610 and 655, respectively, when the touchpad is divided by 1000 in X-axis and Y-axis directions. The pointing position determining unit 303 refers to position-on-touchpad information 400 indicating that an "Input Touchpad ID" is "1", an "X-axis Coordinate on Display Screen" is "610", and a "Y-axis Coordinate on Display Screen" is "655" (Step S301). It is to be noted that the maximum values of the X-axis coordinate on touchpad and the y-axis coordinate on touchpad are 1000.

Then, the pointing position determining unit 303 judges whether or not the "Input Touchpad ID" is "0" (Step S302). Since the "Input Touchpad ID" is "1" (No in Step S302), the pointing position determining unit 303 refers to region assignment information of the right touchpad 202 (Step S304). The pointing position determining unit 303 refers to the region assignment information 420 shown in FIG. 5, to obtain information indicating that the "Start X-axis Coordinate" is "800", the "Start Y-axis Coordinate" is "0", the "End X-axis Coordinate" is "2000", and the "End Y-axis Coordinate" is "1000".

Next, the pointing position determining unit 303 calculates the pointing position information 430 (Step S305). As a result, the X-axis coordinate and the Y-axis coordinate in the pointing position information 430 are calculated as {(2000−800)×(610)/(1000)}+(800)=1532 and {(1000−0)×(655)/(1000)}+(0)=655, respectively.

Referring back to FIG. 7, the object display control unit 305 controls display of an object based on the pointing position information 430 (Step S106). Specifically, the object display control unit 305 searches for an object to be pointed, using a result of parsing the application obtained from the application holding unit 304. Here, the object to be pointed is an object which is to be displayed at a position indicated by the calculated pointing position information and is to be operated by the user.

When a process operation such as changing, at the time of focusing, the size or color of the object to be pointed is specified, the object display control unit 305 performs the specified process. It is to be noted that such a process is publicly known as the technique of reading and parsing a HTML text to display objects or executing a script when focus is given, in a web browser or the like, and thus a description thereof is omitted.

As stated above, when the control of the display of the object ends, the display control device 300 waits for the touchpad device 200 to receive the next input from the user, and repeats the above processes (return to Step S104).

In this manner, each time the touchpad receives the input, the display control device 300 generates or changes the pointing position information 430, and performs the object display control corresponding to the pointing position information 430.

As described above, the touchpad input system according to this embodiment includes: the touchpad device which has the touchpads and assigns a different display region to each of the touchpads; and the display control device. The display control device includes: an operation ratio setting unit which sets an operation ratio for the respective touchpads; a region assigning unit which assigns the regions of the display screen to the touchpads in a corresponding manner based on the operation ratio; and a pointing position determining unit which maps an input on each touchpad to one of the divided regions of the display screen.

This allows, for the user having different operation capabilities for the left and right touchpads, the assignment of the display regions depending on the difference in the operation capabilities for the left and right touchpads. Moreover, with the above configuration, the user can operate, among the touchpads, an easy-to-operate touchpad more frequently and more precisely, and a difficult-to-operate touchpad less frequently and less precisely.

In this embodiment, regarding the assignment of the operation regions of the display screen, a larger operation region is assigned to the easy-to-operate touchpad in comparison with the difficult-to-operate touchpad. Consequently, even if objects appear to be in the same size on the display screen, the difficult-to-operate touchpad has a larger area assigned to the objects than that of the easy-to-operate touchpad.

Therefore, the occurrence of wrong operation is prevented, an operation speed is increased, and an operation time is reduced without changing the number of the objects on the display screen, and thus the touchpad operability can be increased. Furthermore, it is possible to prevent the power consumption from increasing, because it is not necessary to enlarge the display screen or use the screens.

It is to be noted that although the region assigning unit 302 assigns the screen regions of the display screen 111 so that the area ratio between the left touchpad operation region 112 and the right touchpad operation region 113 is equal to the ratio between the left touchpad operation ratio and the right touchpad operation ratio in the operation ratio information 410, the regions may be assigned using any method other than this method.

For instance, the region assigning unit 302 may determine the regions of the display screen 111 and assign the determined regions to the touchpads so that a ratio between the numbers of objects included in the regions is equal to the operation ratio. In other words, the region assigning unit 302 may assign the screen regions of the display screen 111 so that the number of the objects in the operation region of each touchpad is changed according to the operation ratio.

Specifically, the region assigning unit 302 assigns the screen regions of the display screen 111 so that, among the touchpads, a touchpad with a higher operation capability of the user operates more objects. More specifically, the region assigning unit 302 may assign the screen regions of the display screen 111 so that a ratio between the number of objects in the operation region of the left touchpad 201 and the number of objects in the operation region of the right touchpad 202 is equal to the ratio between the left touchpad operation ratio and the right touchpad operation ratio in the operation ratio information 410.

Here, the region assigning unit 302 obtains, from the object display control unit 305, object information indicating characteristics of objects to be placed on the display screen 111.

FIG. 10 is a diagram illustratively showing an example of a data structure of an object information list according to Embodiment 1 of the present invention.

An object information list 440 includes object information items 441 for all objects used by an application. The all objects used by the application are all objects that are to be placed on the display screen 111 and are to be operated with the touchpad device 200.

Each object information item 441 includes "Index", "Display Y-axis Coordinate", "Display X-axis Coordinate", "Display Width", and "Display Height".

The "Index" is an identifier for identifying an object. An integer value succeeding "001" is assigned to each of all the objects. It is to be noted that, in the example shown in FIG. 10, "Index" indicating "001" is for "Window" placed at the upper portion of the display screen 111, and "Index" indicating "002" is for "A" placed at the upper left portion of the display screen 111.

The "Display X-axis Coordinate" and "Display Y-axis Coordinate" indicate an X-coordinate and a Y-axis coordinate of a display position of an object on the display screen 111, respectively. It is to be noted that, here, the object is rectangle, and the "Display X-axis Coordinate" and "Display Y-axis Coordinate" are coordinates of the upper left corner of the rectangular object. The "Display X-axis Coordinate" and "Display Y-axis Coordinate" can be any coordinates such as coordinates of the central position of the object and coordinates of the upper right corner or the lower left corner of the rectangular object, as long as the coordinates specify the position of the object.

The "Display Width" and "Display Height" indicate, for instance, a size of an object. Here, the object is rectangular, and thus its size is indicated by width and height.

Figure 11:
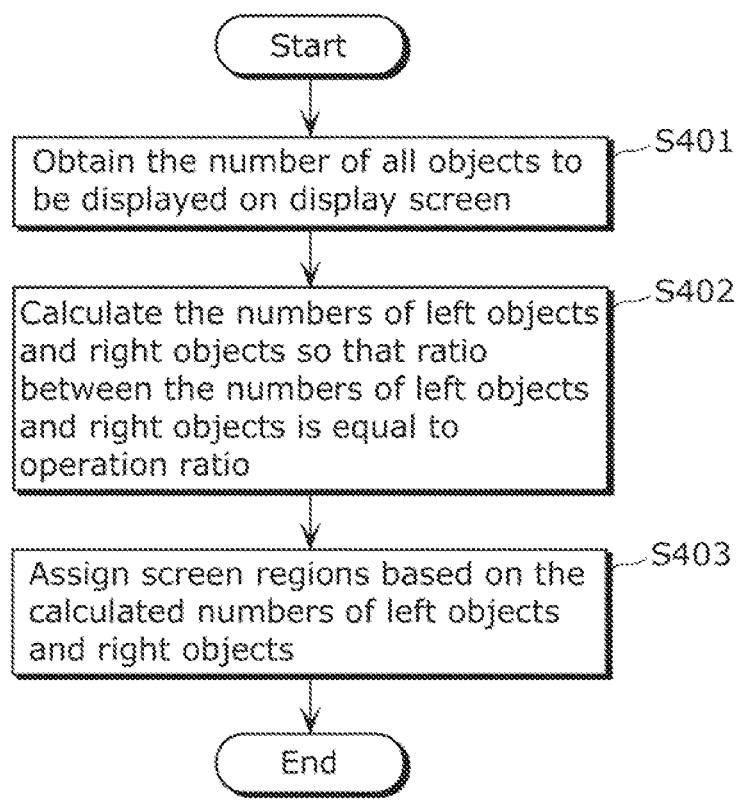
FIG. 11 is a flowchart showing another example of a procedure in which the region assigning unit assigns regions in the touchpad input system according to Embodiment 1 of the present invention.

FIG. 11 is a flowchart showing an example of a procedure in which regions are assigned based on a ratio between the number of objects in the left touchpad operation region 112 and the number of objects in the right touchpad operation region 113 according to Embodiment 1 of the present invention.

The region assigning unit 302 obtains the object information list 440 from the object display control unit 305, thereby obtaining the total number of objects (the number of all objects) on the display screen 111 (Step S401).

It is to be noted that the number of all the objects is the total number of the objects to be displayed on one screen determined by the application. In the example shown in FIGS. 1 and 10, the total number of the objects is 29 which are "Window (frame at the upper portion of a screen)", "A" to "Z", "?", and "BS".

Next, the region assigning unit 302 calculates, based on the operation ratio information 410, the numbers of objects for the left touchpad (left objects) and objects for the right touchpad (right objects) according to (Equation 3) and (Equation 4) so that the ratio between the numbers of the objects on the display screen is equal to the operation ratio (Step S402).

(the number of objects for the left touchpad 201)=(the number of all objects)×(left touchpad operation ratio)  (Equation 3)

(the number of objects for the right touchpad 202)= (the number of all objects)×(right touchpad operation ratio)  (Equation 4)

For example, the operation ratio information 410 shown in FIG. 4 indicates that the "left touchpad operation ratio" is "0.4" and the "right touchpad operation ratio" is "0.6", and the number of all the objects on the display screen 111 is 29. Thus, the number of objects for the left touchpad 201 is calculated as "29×0.4=11.6", and the number of objects for the right touchpad 202 is calculated as "29×0.6=17.4". It is to be that the number of objects is an integer number, and thus the number of decimals of each of the values may be rounded up (or rounded off) to determine that the number of the objects for the left touchpad 201 is "12" and the number of the objects for the right touchpad 202 is "18" (or "17" in the case of rounding off).

Next, the region assigning unit 302 assigns the screen regions of the display screen 111 based on the area of the display screen 111 and the numbers of the objects for the left touchpad and the right touchpad (Step S403). The following describes the details of Step S403.

Where the number of the objects for the left touchpad 201 is "L", an X-axis coordinate at the left end of a region of the left touchpad 201 is 0, and an X-axis coordinate at the right end of the region is calculated by (Equation 5).

(the X-axis coordinate at the right end of the region of the left touchpad 201)=(a L-th largest X-axis coordinate of an object at the right end)  (Equation 5)

The object having the L-th largest X-axis coordinate at the right end is an object at the far right end among the objects assigned to the left touchpad 201. Specifically, the region assigning unit 302 calculates an X-axis coordinate of an object at the right end as "Display X-axis coordinate"+"Display Width", because the "Display X-axis coordinate" in the object information list 440 indicates an X-axis coordinate of an object at the left end. It is to be noted that when there are objects having the same X-axis coordinate at the right end, the objects may be placed in ascending order of a Y-axis coordinate.

Likewise, where the number of the objects for the right touchpad 202 is "R", an X-axis coordinate at the right end of a region of the left touchpad 201 is an X-axis coordinate at the right end of the display screen 111 (e.g. 2000). An X-axis coordinate at the left end of the region of the right touchpad 202 is calculated by (Equation 6).

(the X-axis coordinate at the left end of the region of the right touchpad 202)=(an R-th smallest X-axis coordinate of an object at the left end)  (Equation 6)

The object having the R-th smallest X-axis coordinate at the left end is an object at the far left end among the objects assigned to the right touchpad 202. It is to be noted that when there are objects having the same X-axis coordinate at the left end, the objects may be placed in ascending order of a Y-axis coordinate.

For instance, when the number of the objects for the left touchpad 201"L" is "12" and the number of the objects for the right touchpad 202 "R" is "18", in the object information list 440, an object having the 12th largest X-axis coordinate at the right end is an object having "Index" of "012", that is, an object having "Text" of "S", "Display X-axis coordinate" of "500", and "Display Width" of "100". The X-axis coordinate of the object at the right end is calculated as 500+100=600, and thus the start X-axis coordinate and the end X-axis coordinate of the region of the left touchpad 201 are 0 and 600, respectively.

Likewise, regarding the right touchpad 202, in the object information list 440, an object having the 18th smallest X-axis coordinate at the left end is an object having "Index" of "011", that is, an object having "Text" of "K" and "Display X-axis coordinate" of "500". Thus, when the X-axis coordinate and the Y-axis coordinate of the display screen 111 range from 0 to 2000 and from 0 to 1000, respectively, the start X-axis coordinate and the end X-axis coordinate of the region of the right touchpad 202 are 500 and 2000, respectively.

The region assigning unit 302 notifies the pointing position determining unit 303 of each of information indicating the operation region of the left touchpad 201 and information indicating the operation region of the right touchpad 202 as the region assignment information 420. It is to be noted that the operation ratio may not necessarily match the ratio between the numbers of the objects. The region assigning unit 302 may assign the regions so that more objects are assigned to a touchpad having higher operation capability.

Moreover, the region assigning unit 302 may determine the regions of the display screen 111 and assign the determined regions to the touchpads so that a ratio between amounts of operation for the objects in the respective regions is equal to the operation ratio. Specifically, the region assigning unit 302 may assign the screen regions of the display screen 111 so that a ratio between an amount of operation with the left touchpad 201 and an amount of operation with the right touchpad 202 is equal to the ratio between the left touchpad operation ratio and the right touchpad operation ratio.

For example, the region assigning unit 302 estimates an operation probability that is a probability of operating one of the objects, or calculates the operation probability from a past operation history. The region assigning unit 302 calculates a ratio between a cumulative total value of operation probabilities for all the objects in the operation region of the left touchpad 201 and a cumulative total value of operation probabilities for all the objects in the operation region of the right touchpad 202. Then, the region assigning unit 302 assigns the screen regions of the display screen 111 so that the calculated ratio is equal to the ratio between the left touchpad operation ratio and the right touchpad operation ratio in the operation ratio information 410. As stated above, the region assigning unit 302 may determine the regions of the display screen 111 and assign the determined regions to the touchpads so that the ratio between the operation probabilities, each of which is the probability of operating one of the objects in one of the regions, is equal to the operation ratio.

It is to be noted that the operation ratio may not necessarily match the ratio between the amounts of operation. The region assigning unit 302 may assign the regions so that a touchpad having higher operation capability is operated more frequently.

Moreover, the region assigning unit 302 may determine the regions of the display screen 111 and assign the determined regions to the touchpads so that a ratio between sums of areas of the objects in the respective regions is equal to the operation ratio. Specifically, the region assigning unit 302 may assign the screen regions of the display screen 111 so that a ratio between a cumulative total value of areas of all the objects in the operation region of the left touchpad 201 and a cumulative total value of areas of all the objects in the operation region of the right touchpad 202 is equal to the ratio between the left touchpad operation ratio and the right touchpad operation ratio in the operation ratio information 410.

It is to be noted that the operation ratio may not necessarily match the ratio between the cumulative total values of the areas of the objects. The region assigning unit 302 may assign the regions so that more objects are assigned to a touchpad having higher operation capability.

Moreover, the region assigning unit 302 may determine the regions of the display screen 111 and assign the determined regions to the touchpads so that a reciprocal ratio between a smallest area, among the areas of the objects in the respective regions, and an area of a corresponding one of the regions is equal to the operation ratio. Specifically, the region assigning unit 302 may assign the regions of the display screen 111 based on the size of the operation region of the left touchpad 201 which is assigned to the smallest object in the operation region of the left touchpad 201 and the size of the operation region of the right touchpad 202 which is assigned to the smallest object in the operation region of the right touchpad 202.

Figure 12:
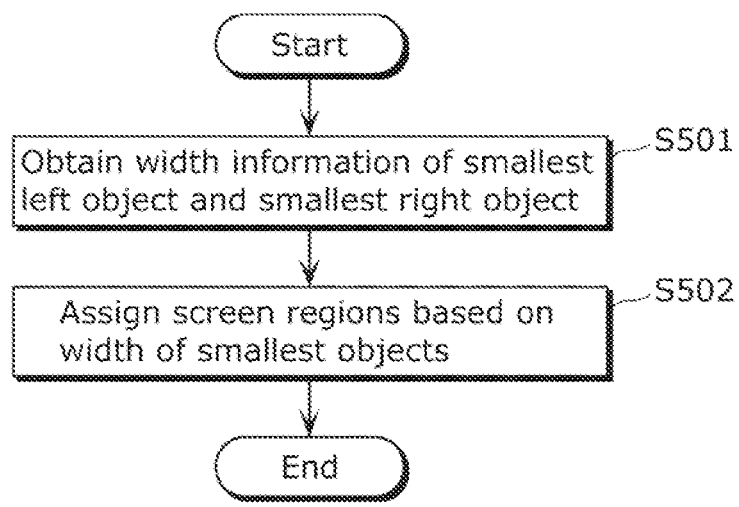
FIG. 12 is a flowchart showing still another example of a procedure in which the region assigning unit assigns regions in the touchpad input system according to Embodiment 1 of the present invention.

FIG. 12 is a flowchart showing an example of a procedure which is different from those in FIGS. 8 and 11 and in which the region assigning unit 302 assigns regions according to Embodiment 1 of the present invention.

The region assigning unit 302 obtains width information of an object having the smallest width among all the objects in the operation region of the left touchpad 201 and width information of an object having the smallest width among all the objects in the operation region of the right touchpad 202, when the display screen 111 is provisionally divided at the middle (Step S501).

Next, the region assigning unit 302 assigns the screen regions of the display screen 111 based on the smallest width of the objects for the left touchpad and the right touchpad (Step S502). For instance, the region assigning unit 302 assigns the screen regions of the display screen 111 so that a ratio between the smallest width of the object for the left touchpad 201 corresponding to the operation region of the left touchpad 201 and the smallest width of the object for the right touchpad 202 corresponding to the operation region of the right touchpad 202 is equal to the reciprocal of the operation ratio. Specifically, the width of the left touchpad operation region 112 and the width of the right touchpad operation region 113 which satisfy (Equation 7) are calculated.

(the smallest width of the object in the operation region of the left touchpad 201/the width of the left touchpad 201 on the display screen 111):(the smallest width of the object in the operation region of the right touchpad 202/the width of the right touchpad 202 on the display screen 111)= (1/the left touchpad operation ratio):(1/the right touchpad operation ratio)     (Equation 7)

Here, the width of the left touchpad 201 on the display screen 111 is equivalent to "end X-axis coordinate−start X-axis coordinate" of the operation region of the left touchpad 201. Likewise, the width of the right touchpad 202 is equivalent to "end X-axis coordinate−start X-axis coordinate" of the operation region of the right touchpad 202. Moreover, the start X-axis coordinate of the left touchpad 201 is 0, and the end X-axis coordinate of the operation region of the right touchpad 202 is the maximum value of the X-axis coordinate of the display screen 111 (e.g. 2000).

Thus, the region assigning unit 302 calculates M satisfying (Equation 8) below.

(the smallest width of the object in the operation region of the left touchpad 201/M):(the smallest of the object in the operation region of the right touchpad 202/(the maximum value of the X-axis coordinate of the display screen 111−M)=(1/the left touchpad operation ratio):(1/the right touchpad operation ratio)   (Equation 8)

As stated above, the region assigning unit 302 assigns the screen regions of the display screen 111 so that a touchpad having a lower operation capability easily operates objects having a small width and that a reciprocal ratio between the relative areas of objects is equal to the operation ratio. The relative area of an object is the area of the object having the smallest width with respect to the operation region of a touchpad. (Equation 7) and (Equation 8) above are just examples, and the region assigning unit 302 may assign the screen regions of the display screen 111 based on other equations.

For example, a case is assumed where the smallest width of an object in the operation region of the left touchpad 201 is "50", the smallest width of an object in the operation region of the right touchpad 202 is "100", the maximum value of an X-axis coordinate of the display screen 111 is "2000", and the maximum value of a Y-axis coordinate of the display screen 111 is "1000". Here, the region assigning unit 302 calculates, based on (Equation 8), M satisfying (50/M):{100/(2000−M)}=(1/0.4):(1/0.6).

M=500 is calculated by solving the above equation. Consequently, the region assigning unit 302 generates region assignment information indicating that a "start X-axis coordinate", a "start Y-axis coordinate", an "end X-axis coordinate", and an "end Y-axis coordinate" are "0", "0", "500", and "1000", respectively, when a "Region Touchpad ID" is "0", and a "start X-axis coordinate", a "start Y-axis coordinate", an "end X-axis coordinate", and an "end Y-axis coordinate" are "500", "0", "2000", and "1000", respectively, when a "Region Touchpad ID" is "1". Then, the region assigning unit 302 notifies the pointing position determining unit 303 of the generated region assignment information.

It is to be noted that the operation ratio may not necessarily match the reciprocal ratio between the relative areas of the smallest objects. The region assigning unit 302 may assign the regions so that smaller objects are assigned to a touchpad having higher operation capability.

It is to be noted that although the display screen 111 is divided into right and left in this embodiment, the display screen 111 may be divided into top and bottom when touchpads are arranged one above the other. In other words, the regions of the display screen 111 may be side-by-side horizontally or vertically.

It is to be noted that although this embodiment has described the two touchpads, the same method can be applied even when there are three or more touchpads. For instance, in the case of a touchpad device 1200 which is shown in FIG. 27 and includes four touchpads (a top-left touchpad 1201, a top-right touchpad 1202, a bottom-left touchpad 1203, and a bottom-right touchpad 1204), the top-left, top-right, bottom-left, and bottom-right regions (a top-left touchpad operation region 1212, a top-right touchpad operation region 1213, a bottom-left touchpad operation region 1214, and a bottom-right touchpad operation region 1215) of a display screen 1211 may be assigned to the four touchpads according to a set operation ratio.

Embodiment 2

A display control device according to Embodiment 2 of the present invention is characterized by assigning objects placed on a display screen to touchpads based on an operation ratio indicating a ratio between operation capabilities of the user for the respective touchpads. Specifically, the display control device according to Embodiment 2 of the present invention is characterized by correcting the assigned objects so that the assigned objects are placed in predetermined regions of the display screen.

FIG. 13 is a diagram schematically showing a touchpad input system 500 according to Embodiment 2 of the present invention. The touchpad input system 500 includes a touchpad device 200 and a display control device 600.

A display screen 515 is an example of a display screen on which objects (objects 514, 515, and so on) are placed. It is to be noted that predetermined regions which are assigned to touchpads are determined for the display screen 511. In other words, the positions of the regions on the display screen 511 are fixed. It is to be noted that, for instance, an object assigning unit 602 can perform a process of assigning the regions of the display screen 511 to the touchpads.

The touchpad device 200 includes a left touchpad 201 and a right touchpad 202. It is to be noted that the touchpad device 200 according to this embodiment is the same as the touchpad device 200 according to Embodiment 1 shown in FIG. 1.

The left touchpad 201 and the right touchpad 202 each are defined by a touchpad region associated with the screen region of the display screen 511, using absolute coordinates. In this embodiment, the touchpad region of the left touchpad 201 is associated with a left touchpad operation region 512 of the display screen 511. Moreover, the touchpad region of the right touchpad 202 is associated with a right touchpad operation region 513 of the display screen 511.

For instance, the top left corner and the bottom right corner of the left touchpad 201 are mapped to those of the left touchpad operation region 512, respectively. It is to be noted that the same applies to the top right corner and the bottom left corner of the left touchpad 201. Objects in the range of the left touchpad operation region 512, e.g. the object 515, are operated with the left touchpad 201.

Similarly, the top left corner and the bottom right corner of the right touchpad 202 are mapped to those of the right touchpad operation region 513, respectively. It is to be noted that the same applies to the top right corner and the bottom left corner of the right touchpad 202. Objects in the range of the right touchpad operation region 513, e.g. the object 514, are operated with the right touchpad 202.

When a finger 520 touches the right touchpad 202, the touchpad device 200 generates position-on-touchpad information, using position information about a position on the touchpad region of the right touchpad 202, that is, information about an X-axis coordinate and a Y-axis coordinate. The touchpad device 200 transmits the generated position-on-touchpad information within the touchpad region to the display control device 600.

The left touchpad 201 and the right touchpad 202 each are defined by the touchpad region associated with the screen region of the display screen 111, using the absolute coordinates. The display control device 600 calculates, using position information about a position on a touchpad region, corresponding position information about a position on the right touchpad operation region 513 of the display screen 511, that is, an X-axis coordinate and a Y-axis coordinate of the right touchpad operation region 113. Then, the display control device 600 changes the display color or display size of the object 514 on corresponding coordinates of the display screen 515, and thus presents to a user that a pointing position, corresponding to an input on the touchpad with the finger 520, on the display screen 151 is over the object 514.

It is to be noted that the technique of detecting which part of the touchpad device 200 is touched with the finger 520 by using electrostatic touchpads as touchpads (the left touchpad 201 and the right touchpad 202) in the touchpad device 200 is publicly known, and thus a description thereof is omitted.

In the touchpad input system 500 according to this embodiment, the display screen 511 is divided into regions at a predetermined position, and the divided regions are assigned to touchpads. In the example shown in FIG. 13, the display screen 511 is divided into the two regions at the middle. The left-hand screen of the display screen 511 is assigned to the left touchpad 201 as the left touchpad operation region 512, and the right-hand screen of the display screen 511 is assigned to the right touchpad 202 as the right touchpad operation region 513.

It is to be noted that a position at which the display screen 511 is divided does not have to be the middle. For instance, as performed by the display control device 300 according to Embodiment 1, the dividing position may be determined based on an operation ratio. Moreover, the regions of the display screen 511 may partially overlap with each other.

FIG. 14 is a block diagram showing configuration examples of the touchpad device 200 and the display control device 600 according to Embodiment 2 of the present invention.

The touchpad device 200 includes the left touchpad 201, the right touchpad 202, the left touch information detecting unit 203, and the right touch information detecting unit 204. The display control device 600 includes the operation ratio setting unit 301, the object assigning unit 602, a touch information correcting unit 603, the application holding unit 304, an object display control unit 605, and an object information correcting unit 606.

A display unit 310 has the display screen 511. It is to be noted that, as shown in FIG. 13, the display control device 600 may include the display unit 310.

The touchpad device 200 shown in FIG. 14 is the same as the touchpad device 200 shown in FIG. 1, and thus a description thereof is omitted hereafter. The former differs from the latter in that each of the left touch information detecting unit 203 and the right touch information detecting unit 204 notifies not the pointing position determining unit 303 but the touch information correcting unit 603 of the generated position-on-touchpad information.

The operation ratio setting unit 301 sets an operation ratio in the same manner as in Embodiment 1, and outputs, to the object assigning unit 602, the operation ratio as operation ratio information.

The object assigning unit 602 is an example of an assigning unit according to the present invention, and assigns objects to touchpads based on the operation ratio. For example, the object assigning unit 602 assigns the objects to the touchpads based on the operation ratio so that more objects are assigned to, among the touchpads, a touchpad with a higher operation capability of the user. In this embodiment, the object assigning unit 602 assigns the objects to the touchpads so that the number of objects assigned to each touchpad is equal to the number of objects in each of provisional regions obtained by provisionally dividing the display screen 511 so that an area ratio between the regions is equal to the operation ratio.

More specifically, the object assigning unit 602 divides the display screen 511 into two provisional regions based on the operation ratio. The object assigning unit 602 assigns the objects to the left touchpad 201 and the right touchpad 202 so that the number of objects in each of the left touchpad operation region 512 and the right touchpad operation region 513 is equal to the number of objects in each of the two divided provisional regions.

In other words, the object assigning unit 602 determines how to assign objects to be displayed on the display screen 511 to the left touchpad operation region 512 and the right touchpad operation region 513, using operation ratio information notified by the operation ratio setting unit 301 and an object information list notified by the object display control unit 605. Then, the object assigning unit 602 notifies the object information correcting unit 606 of information in which each of a region corresponding to the left touchpad 201 and a region corresponding to the right touchpad 202 in an application is expressed with an X-axis coordinate and a Y-axis coordinate, as object assignment information.

The touch information correcting unit 603 is an example of a position-on-screen determining unit according to the present invention, and determines a pointing position on the display screen 511, using position-on-touchpad information notified by the left touch information detecting unit 203 or the right touch information detecting unit 204. Then, the touch information correcting unit 603 notifies the object display control unit 605 of the determined pointing position as pointing position information.

The application holding unit 304 holds at least one application as in Embodiment 1, and transfers an application to be executed to the object display control unit 605.

The object information correcting unit 606 corrects at least one object so that the objects are placed in the regions assigned to the touchpads by the object assigning unit 602. For instance, when an object is assigned to the right touchpad 202, the object information correcting unit 606 corrects the object so that the object is placed in the right touchpad operation region 513.

Specifically, the object information correcting unit 606 obtains, from the object display control unit 605, an object information list including object information indicating the positions, sizes, and so on of all objects in the application. Then, the object information correcting unit 606 corrects the object information list based on region assignment information (which is predetermined in this embodiment), and notifies the object display control unit 605 of the corrected object information list.

The object display control unit 605 controls the display of an object placed at the pointing position indicated by the pointing position information.

Specifically, the object display control unit 605 first obtains an application to be executed from the application holding unit 304. Then, the object display control unit 605 parses the obtained application, and obtains object information such as positions, sizes, and the like of objects, or process operation information at the time when the objects are focused or selected.

The object display control unit 605 notifies the object information correcting unit 606 and the object assigning unit 602 of the obtained object information list as the object information indicating the positions, sizes, and the like of all the objects. The object display control unit 605 then obtains the corrected object information list from the object information correcting unit 606, and instructs the display unit 310 to display the objects, according to the corrected object information list. Alternatively, the object display control unit 605 determines, among the objects, an object that is pointed, based on the pointing position information notified by the touch information correcting unit 603, and executes a corresponding process operation.

It is to be noted that a technique of parsing an application, performing object display control, and executing a corresponding process operation is publicly known as the technique of reading and parsing a HTML text to display objects or executing a script when focus is given, in the web browser or the like, and thus a description thereof is omitted.

It is to be noted that, in Embodiment 2 of the present invention, the position-on-touchpad information of which the left touch information detecting unit 203 or the right touch information detecting unit 204 notifies the touch information correcting unit 603 is the same as the position-on-touchpad information in Embodiment 1 of the present invention, and is the position-on-touchpad information 400 as shown in FIG. 3, for example.

Moreover, in Embodiment 2 of the present invention, the operation ratio information of which the operation ratio setting unit 301 notifies the object assigning unit 602 is the same as the operation ratio information in Embodiment 1 of the present invention, and is the operation ratio information 410 as shown in FIG. 4, for example.

FIG. 15 is a diagram illustratively showing an example of object assignment information of which the object assigning unit 602 notifies the object information correcting unit 606 according to Embodiment 2 of the present invention. In this embodiment, the object assigning unit 602 assigns the objects to the touchpads based on the number of the objects in each provisional region obtained by provisionally dividing the display screen 511 at the operation ratio. In other words, the object assignment is determined by the provisional regions obtained through the provisional division using the operation ratio. Thus, the object assignment information in this embodiment is the same as the region assignment information in Embodiment 1.

Object assignment information 700 shown in FIG. 15 includes "Corresponding Touchpad ID", "Start X-axis Coordinate", "Start Y-axis Coordinate", "End X-axis Coordinate", and "End Y-axis Coordinate".

The "Corresponding Touchpad ID" is an identifier indicating which touchpad object assignment information corresponds to. The "Start X-axis Coordinate" and the "Start Y-axis Coordinate" are an X-axis coordinate and a Y-axis coordinate for a region start position on the display screen 511 at which a region of the touchpad is corresponded to a region of the display screen 111, respectively. The "End X-axis Coordinate" and the "End Y-axis Coordinate" are an X-axis coordinate and a Y-axis coordinate for a region end position on the display screen 511 at which the region of the touchpad is corresponded to the region of the display screen 111, respectively. Here, as an example, the "Corresponding Touchpad ID" of the left touchpad 201 indicates "0", and the "Corresponding Touchpad ID" of the right touchpad 202 indicates "1".

A region defined by the "Start X-axis coordinate", "Start Y-axis coordinate", "End X-axis coordinate", and "End Y-axis coordinate" corresponding to the "Corresponding Touchpad ID" "0" corresponds to the provisional region of the left touchpad 201. A region defined by the "Start X-axis coordinate", "Start Y-axis coordinate", "End X-axis coordinate", and "End Y-axis coordinate" corresponding to the "Corresponding Touchpad ID" "1" corresponds to the provisional region of the right touchpad 202.

Figure 16:
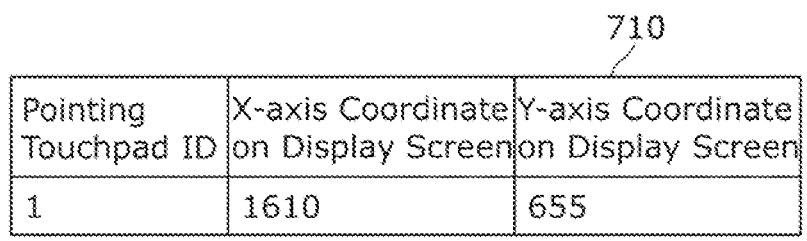
FIG. 16 is a diagram illustratively showing an example of a data structure of pointing position information generated by a touch information correcting unit according to Embodiment 2 of the present invention.

FIG. 16 is a diagram illustratively showing an example of pointing position information of which the touch information correcting unit 603 notifies the object display control unit 605 according to Embodiment 2 of the present invention. Pointing position information 710 shown in FIG. 16 includes "Pointing Touchpad ID", "X-axis Coordinate on Display Screen", and "Y-axis Coordinate on Display Screen".

The "Pointing Touchpad ID" is an identifier indicating which touchpad pointing position information corresponds to. The "X-axis Coordinate on Display Screen" and the "Y-axis Coordinate on Display Screen" are an X-axis coordinate and a Y-axis coordinate on the display screen 511, respectively, which correspond to the "X-axis coordinate on Touchpad" and the "Y-axis Coordinate on Touchpad" in the position-on-touchpad information 400.

It is to be noted that, in Embodiment 2 of the present invention, the object information list of which the object display control unit 605 notifies the object information correcting unit 606 is the same as the object information list in Embodiment 1 of the present invention, and is the object information list 440 as shown in FIG. 10, for example.

Figure 17:
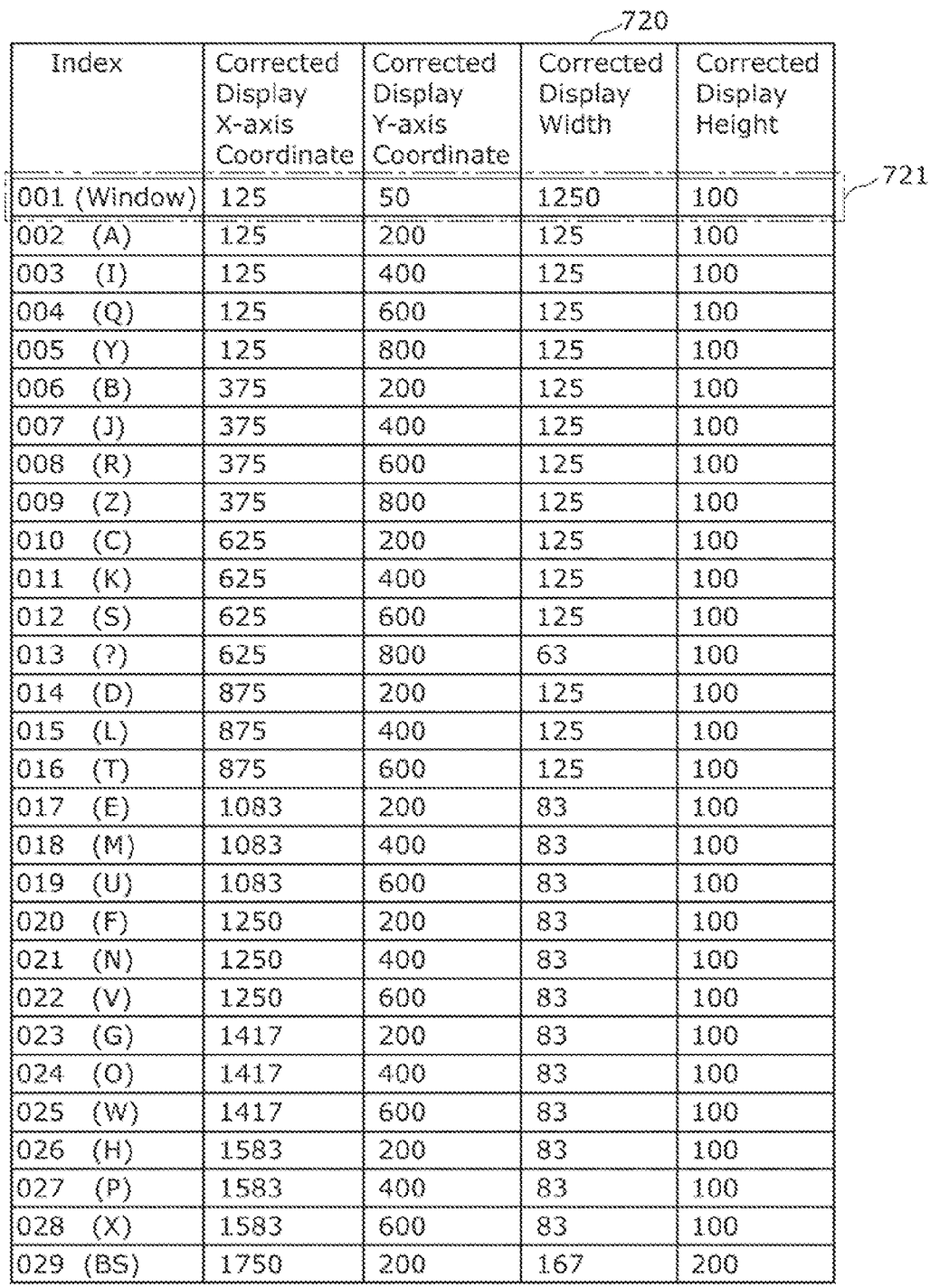
FIG. 17 is a diagram illustratively showing an example of a data structure of a corrected object information list according to Embodiment 2 of the present invention.

FIG. 17 is a diagram illustratively showing an example of a data structure of a corrected object information list 720 resulting from the correction of the object information list 440 by the object information correcting unit 606 according to Embodiment 2 of the present invention.

The corrected object information list 720 includes corrected object information items 721 for all objects used by an application. One corrected object information item 721 includes "Index", "Corrected Display X-axis coordinate", "Corrected Display Y-axis coordinate", "Corrected Display Width", and "Corrected Display Height".

The "Index" is an identifier for identifying an object. The "Index" in the corrected object information list 720 corresponds to the "Index" in the object information list 440. For instance, a corrected object of the object information item 441 having the "Index" of "001" in the object information list 440 shown in FIG. 10 is the corrected object information item 721 having the "Index" of "001" shown in FIG. 17.

The "Corrected Display X-axis coordinate" and the "Corrected Display Y-axis coordinate" are an X-axis coordinate and a Y-axis coordinate of a corrected display position of an object on the display screen 511, respectively. The "Corrected Display Width" and the "Corrected Display Height" are examples indicating the size of the corrected object. Specifically, the "Corrected Display Width" is the corrected width of an object on the display screen 511. The "Corrected Display Height" is the corrected height of the object on the display screen 511.

The following describes operations of the touchpad input system 500 according to Embodiment 2 of the present invention.

Figure 18:
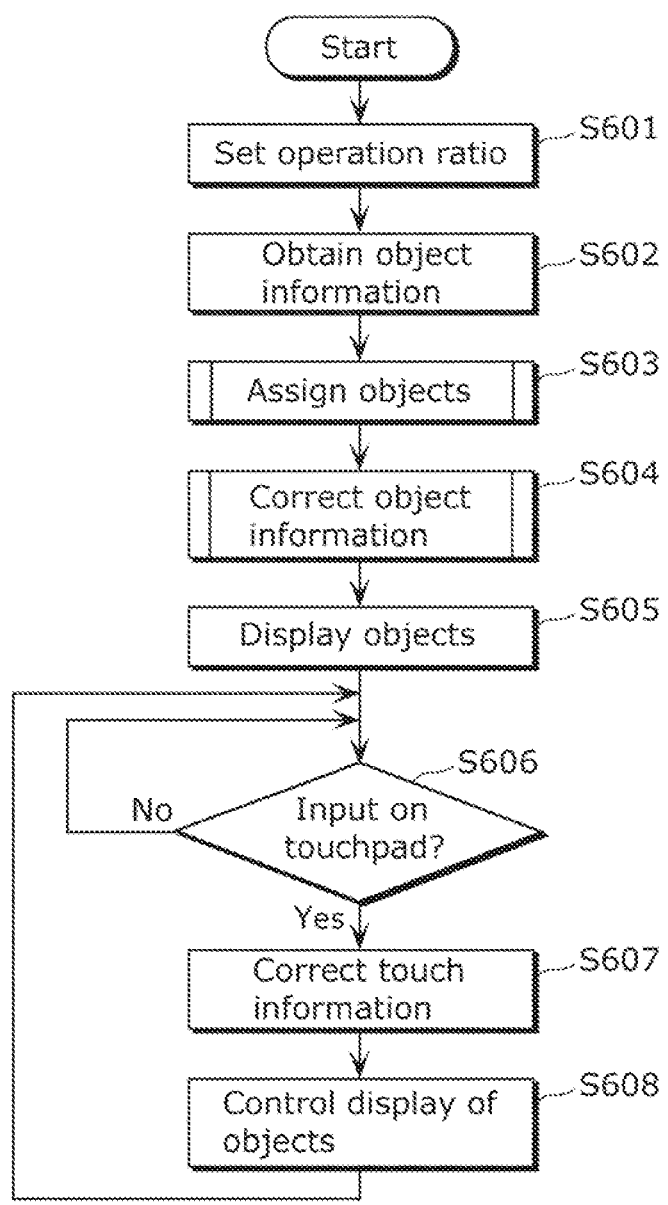
FIG. 18 is a flowchart showing an example of a procedure in which a touchpad input system according to Embodiment 2 of the present invention applies an input on the touchpad device to screen display.

FIG. 18 is a flowchart showing an example of a procedure in which the touchpad input system 500 according to Embodiment 2 of the present invention presents an input on the touchpad device 200 for screen display. The following describes in detail processes in Embodiment 2 of the present invention with reference to FIG. 18.

First, the operation ratio setting unit 301 sets an operation ratio between the left touchpad 201 and the right touchpad 202 based on touchpad operation setting information, and notifies the object assigning unit 602 of the set operation ratio as operation ratio information 410 (Step S601). For instance, the operation ratio setting unit 301 causes the user to input the dominant hand, sets a "left touchpad operation ratio" and a "right touchpad operation ratio" to "0.4" and "0.6", respectively, when the input dominant hand is the right hand, and generates the operation ratio information 410.

Next, the object display control unit 605 obtains the object information list 440 from the application holding unit 304 (Step S602). Specifically, the object display control unit 605 obtains an application to be executed from the application holding unit 304, parses the obtained application, and obtains the object information list 440 including information indicating the positions and sizes of all objects used for the application. Then, the object display control unit 605 notifies the object assigning unit 602 and the object information correcting unit 606 of the obtained object information list 440.

A technique of obtaining, using the DOM, XML parser, or the like, a position or a size of an object from a text document described in a markup language such as HTML and XML or a script language such as JavaScript™ is publicly known, and thus a detailed description thereof is omitted. For example, the object display control unit 605 generates the object information list 440 by parsing the application, and notifies the object assigning unit 602 and the object information correcting unit 606 of the obtained object information list 440.

Next, the object assigning unit 602 assigns the objects to the touchpads so that the number of objects assigned to each touchpad is equal to the number of objects in each provisional region obtained by dividing the display screen 511 so that the area ratio is equal to the operation ratio, using the notified operation ratio information 410 and object information list 440 (Step S603). Specifically, the object assigning unit 602 determines, using the notified operation ratio information 410, object assignment positions, that is, a provisionally dividing position for the display screen 511, and notifies the object information correcting unit 606 of the object assignment information 700.

Specifically, the object assigning unit 602 determines at which position on the display screen 511 each object in the object information list 440 is to be placed, with reference to the "Display X-axis coordinate" and the "Display Y-axis coordinate". Then, the object assigning unit 602 determines in which provisional region each object is to be placed, among the provisional regions obtained by dividing the display screen 511 so that the area ratio is equal to the operation ratio. The object assigning unit 602 assigns the object placed in the left provisional region to the left touchpad 201, and the object placed in the right provisional region to the right touchpad 202.

In this embodiment, the objects are assigned to the left touchpad 201 and the right touchpad 202 depending on the regions assigned in Embodiment 1. In other words, the object assigning unit 602 assigns, for example, each object in the left touchpad operation region 112 shown in FIG. 1 to the left touchpad 201, and each object in the right touchpad operation region 113 shown in FIG. 1 to the right touchpad 202. To put it differently, each of the left touchpad operation region 112 and the right touchpad operation region 113 m shown in FIG. 1 is a region that is assigned so that the area ratio between the regions is equal to the operation ratio, and corresponds to the provisional region. As stated above, the object assignment in this embodiment is the same as the region assignment in Embodiment 1, and thus a description thereof is omitted.

For instance, a case is assumed where the operation ratio information 410 indicates that the "left touchpad operation ratio" and the "right touchpad operation ratio" are "0.4" and "0.6", respectively, and an X-axis coordinate and a Y-axis coordinate on the display screen 511 range from 0 to 2000 and 0 to 1000, respectively. In this case, the object assigning unit 602 assigns objects in a provisional region having the X-axis coordinate from 0 to 800, to the left touchpad 201, and objects in a provisional region having the X-axis coordinate from 800 to 2000, to the right touchpad 202. Then, the object assigning unit 602 notifies the object information correcting unit 606 of the object assignment information 700 as shown in FIG. 15.

Next, the object information correcting unit 606 corrects the object information list 440 notified by the object display control unit 605, based on the object assignment information 700 (Step S604). Then, the object information correcting unit 606 notifies the object display control unit 605 of the corrected object information list 720.

The following describes in detail a method of correcting object information 441, which is performed by the object information correcting unit 606.

Figure 19:
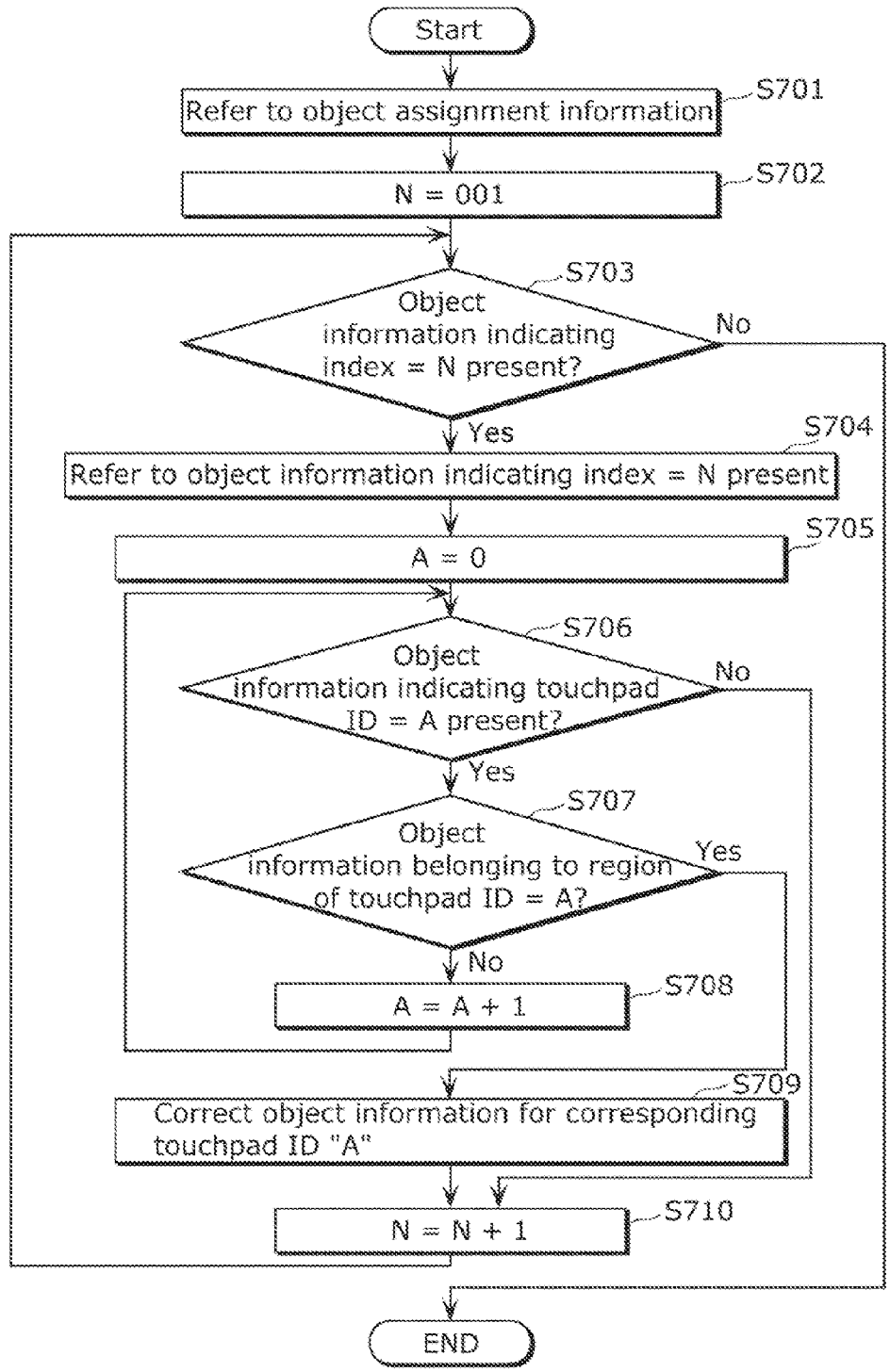
FIG. 19 is a flowchart showing an example of a procedure in which an object information correcting unit according to Embodiment 2 of the present invention corrects object information.

FIG. 19 is a flowchart showing an example of a procedure in which the object information correcting unit 606 according to Embodiment 2 of the present invention corrects object information.

First, the object information correcting unit 606 refers to object assignment information 700 (Step S701). The object information correcting unit 606 refers to, for example, the object assignment information 700 shown in FIG. 15. This informs the object information correcting unit 606 that the objects in the region having the X-axis coordinate from 0 to 800 are assigned to the left touchpad 201, and the objects in the region having the X-axis coordinate from 800 to 2000 are assigned to the right touchpad 202.

Next, the object information correcting unit 606 substitutes "001", the first "Index", for a variable "N" (Step S702).

Next, the object information correcting unit 606 judges whether or not object information indicating that "Index" is "N" is in the object information list 440 (Step S703). When the object information indicating that the "Index" is "N" is not in the object information list 440 (No in Step S703), the object correcting process is ended.

When the object information indicating that the "Index" is "N" is in the object information list 440 (Yes in Step S703), the object information correcting unit 606 refers to the object information indicating that the "Index" is "N" (Step S704).

Next, the object information correcting unit 606 substitutes "0", the first "Corresponding Touchpad ID", for a variable "A" (Step S705).

Next, the object information correcting unit 606 judges whether or not object assignment information indicating that "Corresponding Touchpad ID" is "A" is present (Step S706). When the object assignment information indicating that the "Corresponding Touchpad ID" is "A" is not present (No in Step S706), "N" is incremented by 1, and the process flow returns to judging whether or not object information indicating that "N" is "002" is present (Step 703) (Step S710).

When the object assignment information indicating that the "Corresponding Touchpad ID" is "A" is present (Yes in Step S703), the object information correcting unit 606 judges whether or not, among object information items 441, the object information indicating that the "Index" is "N" belongs to an object assignment region having "A" as the "Corresponding Touchpad ID" (Step S707). Specifically, the object information correcting unit 606 judges whether or not each of a display X-axis coordinate and a display Y-axis coordinate in the object information indicating that the "Index" is "N" satisfies (i) start X-axis coordinate of corresponding touchpad ID "A"<display X-axis coordinate<end X-axis coordinate of corresponding touchpad ID "A" and (ii) start Y-axis coordinate of corresponding touchpad ID "A"<display Y-axis coordinate<end Y-axis coordinate of corresponding touchpad ID "A".

When, among the object information items 441, the object information indicating that the "Index" is "N" does not belong to the object assignment region having "A" as the "Corresponding Touchpad ID" (No in Step S707), "A" is incremented, and the process flow returns to judging whether or not the object assignment information indicating that "A" is "1" is present (Step S706) (Step S708).

When, among the object information items 441, the object information indicating that the "Index" is "N" belongs to the object assignment region having "A" as the "Corresponding Touchpad ID" (Yes in Step S707), the object information correcting unit 606 corrects the object information for the corresponding touchpad ID "A" (Step S709). Specifically, the object information correcting unit 606 generates corrected object information 721 from the object information 441, according to (Equation 9) to (Equation 12).

(corrected display X-axis coordinate)=((display X-axis coordinate)−(actual start X-axis coordinate for corresponding touchpad ID "*A*"))×(the maximum X-axis value of the display screen 511×a division ratio, for corresponding touchpad ID "*A*", on the display screen in the X-axis direction)/(end X-axis coordinate for corresponding touchpad ID "*A*"−start X-axis coordinate for corresponding touchpad ID "A")+actual start X-axis coordinate for corresponding touchpad ID "A"  (Equation 9)

(corrected display Y-axis coordinate)=((display Y-axis coordinate)−(actual start Y-axis coordinate for corresponding touchpad ID "*A*"))×(the maximum Y-axis value of the display screen 511×a division ratio, for corresponding touchpad ID "*A*", on the display screen in the Y-axis direction)/(end Y-axis coordinate for corresponding touchpad ID "*A*"−start Y-axis coordinate for corresponding touchpad ID "*A*")+actual start Y-axis coordinate for corresponding touchpad ID "*A* "  (Equation 10)

(corrected display width)=(display width)×(the maximum X-axis value of the display screen 511×a division ratio, for corresponding touchpad ID "*A*", on the display screen in the X-axis direction)/(end X-axis coordinate for corresponding touchpad ID "*A*"−start X-axis coordinate for corresponding touchpad ID "*A*")  (Equation 11)

(corrected display height)=(display height)×(the maximum Y-axis value of the display screen 511×a division ratio, for corresponding touchpad ID "*A*", on the display screen in the Y-axis direction)/(end Y-axis coordinate for corresponding touchpad ID "*A*"−start Y-axis coordinate for corresponding touchpad ID "*A*")  (Equation 12)

It is to be noted that, in (Equation 9) and (Equation 11), the "start X-axis coordinate for corresponding touchpad ID 'A'" and the "end X-axis coordinate for corresponding touchpad ID 'A'" are, for instance, the "Start X-axis coordinate" and the "End X-axis coordinate" in the object assignment information 700, respectively. Moreover, in (Equation 10) and (Equation 12), the "start Y-axis coordinate for corresponding touchpad ID 'A'" and the "end Y-axis coordinate for corresponding touchpad ID 'A'" are, for example, the "Start Y-axis coordinate" and the "End Y-axis coordinate" in the object assignment information 700, respectively.

It is to be noted that, in (Equation 9), the actual start X-axis coordinate for corresponding touchpad ID "A" is the actual start X-axis coordinate of a touchpad operation region having "A" as the "Corresponding Touchpad ID". In other words, in this embodiment, as shown in FIG. 13, the display screen 511 (having the X-axis coordinate from 0 to 2000) is divided at the middle, and thus an actual start X-axis coordinate for "Corresponding Touchpad ID" "0" is 0, and an actual start X-axis coordinate for "Corresponding Touchpad ID" "1" is 1000.

Likewise, in (Equation 10), the actual start Y-axis coordinate for corresponding touchpad ID "A" is the actual start Y-axis coordinate of a touchpad operation region having "A" as the "Corresponding Touchpad ID". In other words, in this embodiment, as shown in FIG. 13, the display screen 511 (having the Y-axis coordinate from 0 to 1000) is not divided in the Y-axis direction, and thus an actual start Y-axis coordinate for the "Corresponding Touchpad ID" "0" is 0, and an actual start Y-axis coordinate for the "Corresponding Touchpad ID" "1" is 0.

It is to be noted that, in (Equation 9) and (Equation 11), the division ratio, for corresponding touchpad ID "A", on the display screen in the X-axis direction is a ratio in the X-axis direction at which a touchpad having "A" as the "Corresponding Touchpad ID" actually occupies the display screen 511. In other words, in this embodiment, as shown in FIG. 13, the display screen 511 (having the X-axis coordinate from 0 to 2000) is divided at the middle, and thus a division ratio, for the "Corresponding Touchpad ID" "0", on the display screen in the X-axis direction is 0.5, and a division ratio, for the "Corresponding Touchpad ID" "1", on the display screen in the X-axis direction is 0.5.

It is to be noted that, in (Equation 10) and (Equation 12), the division ratio, for corresponding touchpad ID "A", on the display screen in the Y-axis direction is a ratio in the Y-axis direction at which the touchpad having "A" as the "Corresponding Touchpad ID" actually occupies the display screen 511. In other words, in this embodiment, as shown in FIG. 13, the display screen 511 (having the Y-axis coordinate from 0 to 1000) is not divided in the Y-axis direction, and thus a division ratio, for the "Corresponding Touchpad ID" "0", on the display screen in the Y-axis direction is 1.0, and a division ratio, for the "Corresponding Touchpad ID" "1", on the display screen in the Y-axis direction is 1.0.

It is to be noted that although the display screen 511 is evenly divided at the middle in the X-axis direction, the display screen 511 does not need to be evenly divided. For instance, when the display screen 511 is divided at the ratio of 0.45:0.55, the division ratio, for the "Corresponding Touchpad ID" "0", on the display screen in the X-axis direction may be 0.45, and the division ratio, for the "Corresponding Touchpad ID" "1", on the display screen in the X-axis direction may be 0.55.

As stated above, the object information indicating that the "Index" is "001" is corrected, and thus the object information correcting unit 606 increments "N" by 1, and judges again whether or not the object information indicating that "N" is "002" is present (Step S703) (Step S708).

By repeating the above processes, the object information correcting unit 606 corrects the object information list 440, and generates the corrected object information list 720.

Through the processes, the object information correcting unit 606 generates the corrected object information list 720, using the object assignment information 700 and the object information list 440.

The following describes, using specific values, a case where the object assignment information 700 and the object information list 440 are notified to the object information correcting unit 606, with reference to FIG. 19.

First, the object information correcting unit 606 refers to the object assignment information 700 (Step S701). Next, the object information correcting unit 606 substitutes "001", the first "Index", for the variable "N" (Step S702).

Next, the object information correcting unit 606 judges whether or not object information indicating that "Index" is "N (=1)" is in the object information list 440 (Step S703). Here, the object information 441 indicating that "Index" is "001" is present (Yes in Step S703), and thus the object information correcting unit 606 refers to the object information 441 indicating that the "Index" is "001" (Step S704).

Then, the object information correcting unit 606 substitutes "0", the first "Corresponding Touchpad ID", for the variable "A" (Step S705), and judges whether or not object assignment information indicating that "Corresponding Touchpad ID" is "A (=0)" is present (Step S706). Here, as shown in FIG. 15, the object assignment information 700 indicating that the "Corresponding Touchpad ID" is "0" is present (Yes in Step S706), the object information correcting unit 606 judges whether or not the object information indicating that the "Index" is "001" belongs to an object assignment region having "0" as the "Corresponding Touchpad ID" (Step S706).

The "Display X-axis Coordinate" "100" of an object having "Index" of "001" is larger than the "Start X-axis Coordinate" "0" and smaller than the "End X-axis Coordinate" "800". The "Display Y-axis Coordinate" "50" of the object having the "Index" of "001" is larger than the "Start Y-axis Coordinate" "0" and smaller than the "End Y-axis Coordinate" "1000". In other words, the object having the "Index" of "001" is an object to be operated with the left touchpad 201 (Yes in Step S707), and thus the object information correcting unit 606 corrects object information corresponding to the object to be operated with the left touchpad 201 (Step S709).

According to (Equation 9), the corrected display X-axis coordinate in the corrected object information 721 is calculated as (100−0)×(2000×0.5)/(800−0)+(0)=125. According to (Equation 10), the corrected display Y-axis coordinate in the corrected object information 721 is calculated as (50−0)×(1000×1.0)/(1000−0)+(0)=50.

According to (Equation 11), the corrected display width in the corrected object information 721 is calculated as 1000×(2000×0.5)/(800−0)+(0)=1250. According to (Equation 12), the corrected display height in the corrected object information 721 is calculated as (100)×(1000×1.0)/(1000−0)+(0) =100.

As stated above, the object information indicating that the "Index" is "001" is corrected, and thus the object information correcting unit 606 increments "N" by 1, and judges again whether or not the object information indicating that "N" is "002" is present (Step S703) (Step S710).

By repeating the above processes, the object information correcting unit 606 corrects the object information list 440, and generates the corrected object information list 720.

Referring back to FIG. 18, the object display control unit 605 causes the display unit 310 to display the objects (Step S605). Specifically, the object display control unit 605 instructs the display unit 310 to display the object, based on the corrected object information list 720 notified by the object information correcting unit 606. Consequently, the corrected objects are displayed on the display screen 511.

It is to be noted that such a process is publicly known as the technique of reading and parsing a HTML text to display objects or executing a script when focus is given, in a web browser or the like, and thus a description thereof is omitted.

Next, the touch information correcting unit 603 judges whether or not there is an input on at least one of the left touchpad 201 and the right touchpad 202 by the user (Step S606). Specifically, the touch information correcting unit 603 judges whether or not to receive touch information (position-on-touchpad information) from the left touch information detecting unit 203 or the right touch information detecting unit 204 of the touchpad device 200.

When receiving the position-on-touchpad information, the touch information correcting unit 603 judges that there is the input on one of the left touchpad 201 and the right touchpad 202 by the user. When not receiving the position-on-touchpad information, the touch information correcting unit 603 judges that there is no input on both of the left touchpad 201 and the right touchpad 202 by the user.

When there is no input on both of the left touchpad 201 and the right touchpad 202 by the user (No in Step S606), the touch information correcting unit 603 waits for one of the left touchpad 201 and the right touchpad 202 to receive an input from the user (return to Step S606).

When there is the input on one of the left touchpad 201 and the right touchpad 202 by the user (Yes in Step S607), the touch information correcting unit 603 converts the position-on-touchpad information into pointing position information, and notifies the object display control unit 605 of the pointing position information (Step S607).

The following describes in detail a procedure for calculating a pointing position, that is, a procedure for correcting touch information.

In this embodiment, an X-axis coordinate and a Y-axis coordinate in the pointing position information 710 at the time when there is an input on a touchpad having position-on-touchpad information indicating that "Index" is "A" are calculated according to (Equation 13) and (Equation 14), respectively.

(X-axis coordinate in pointing position information 710)={(X-axis coordinate on touchpad in position-on-touchpad information)×(the maximum X-axis value of the display screen 511)/(the maximum X-axis value in position-on-touchpad information)}+actual start X-axis coordinate for "Input Touchpad ID" "A"   (Equation 13)

(Y-axis coordinate in pointing position information 710)={(Y-axis coordinate on touchpad in position-on-touchpad information)×(the maximum Y-axis value of the display screen 511)/(the maximum Y-axis value in position-on-touchpad information)}+actual start Y-axis coordinate for "Input Touchpad ID" "A"   (Equation 14)

In this embodiment, as shown in FIG. 13, the operation region of the left touchpad 201 and the operation region of the right touchpad 202 are obtained by dividing, into right and left, the display screen 511 at the middle in the X-axis direction, like the left touchpad operation region 512 and the right touchpad operation region 513 of the display screen 511. Consequently, where the maximum value of each of the X-axis coordinate and the Y-axis coordinate in the position-on-touchpad information is 1000, the maximum value of the X-axis coordinate on the display screen 511 is 2000, and the maximum value of the Y-axis coordinate on the display screen 511 is 1000, each of an actual start X-axis coordinate and an actual start Y-axis coordinate for the "Input Touchpad ID" "0" is 0, an actual start X-axis coordinate for the "Input Touchpad ID" "1" is 1000, and an actual start Y-axis coordinate for the "input Touchpad ID" "1" is 0.

For example, the X-axis coordinate and the Y-axis coordinate in the pointing position information 710 corresponding to the position-on-touchpad information 400 shown in FIG. 16 are calculated as (610×1000/1000)+1000=1610 and (655×1000/1000)+0=655, respectively, and these values are included in the pointing position information 710.

Referring back to FIG. 18, the object display control unit 605 controls display of an object based on the pointing position information 710 (Step S608). Specifically, the object display control unit 605 searches for an object to be pointed, using the corrected object information list 720 obtained from the object information correcting unit 606. When a process operation such as changing, at the time of focusing, the size or color of the object to be pointed is specified, the object display control unit 605 performs the specified process. It is to be noted that such a process is publicly known as the technique of reading and parsing a HTML text to display objects or executing a script when focus is given, in a web browser or the like, and thus a description thereof is omitted.

As stated above, when the control of the display of the object ends, the display control device 600 waits for the touchpad device 200 to receive the next input from the user, and repeats the above processes (return to Step S606).

In this manner, each time the input is received from the touchpad, the display control device 600 generates or changes the pointing position information 710, and performs the object display control corresponding to the pointing position information 710.

As described above, the display control device 600 according to this embodiment assigns the objects placed on the display screen 511 to the touchpads, based on the operation ratio indicating the ratio between the operation capabilities of the user. In this manner, the objects to be operated with the touchpads are set based on the ratio between the operation capabilities, and thus it is possible to increase the operation efficiency of the user.

It is to be noted that the operation ratio may not necessarily match the ratio between the numbers of the objects. More objects may be assigned to a touchpad with a higher operation capability.

For instance, assigning the more objects to a touchpad operated with a finger having a high operation capability increases the operation efficiency. Moreover, increasing the size of an object assigned to a touchpad operated with a finger having a low operation capability increases the operation efficiency.

It is to be noted that, in this embodiment, the object information correcting unit 606 corrects, for the object information list 440 obtained from the application, both position (X-axis coordinate and Y-axis coordinate) and size (display width and display height) of each object. In contrast, when information for receiving pointing of an object, that is, a pointing-receiving position (X-axis coordinate and Y-axis coordinate) or a pointing-receiving size (width and height) is specified aside from the position and size of the object, the object information correcting unit 606 may correct the pointing-receiving position (X-axis coordinate and Y-axis coordinate) or the pointing-receiving size (display width and display height).

Moreover, the object information correcting unit 606 may correct at least one of the X-axis coordinate of the position of the object, the Y-axis coordinate of the position of the object, the display width of the object, the display height of the object, the X-axis coordinate of the pointing-receiving position, the Y-axis coordinate of the pointing-receiving position, the width in the pointing-receiving size, and the height in the pointing-receiving size.

Furthermore, although the object information correcting unit 606 corrects, for the object information list 440 obtained from the application, all the object information items in this embodiment, the object information correcting unit 606 may correct part of object information items, e.g. an object information item only indicating a small object size (display width and display height).

Moreover, although the left touchpad operation region 512 and the right touchpad operation region 513 are assigned to have the equal area in this embodiment, the left touchpad operation region 512 and the right touchpad operation region 513 may be arbitrarily set.

Furthermore, although the display screen 511 is provisionally divided into right and left in this embodiment, the display screen 511 may be provisionally divided into top and bottom when touchpads are arranged one above the other.

Moreover, although this embodiment has described the two touchpads, the same method can be applied even when there are three or more touchpads. For example, in the case of a touchpad device 1200 which is shown in FIG. 28 and includes four touchpads at the top-left, top-right, bottom-left, and bottom-right, objects may be assigned to the top-left, top-right, bottom-left, and bottom-right touchpads according to a set operation ratio, and the objects may be displayed on a display screen 1311 after an object information list is corrected. With this, the objects are placed in four operation regions (a top-left touchpad operation region 1312, a top-right touchpad operation region 1313, a bottom-left touchpad operation region 1314, and a bottom-right touchpad operation region 1315) each of which is assigned to one of the four touchpads.

As described above, the touchpad input system according to this embodiment includes: the touchpad device which has the touchpads and assigns a different display region to each of the touchpads; and the display control device. The display control device includes: an operation ratio setting unit which sets the operation ratio for the respective touchpads; an object assigning unit which assigns objects to the touchpads in a corresponding manner based on the operation ratio; and an object information correcting unit which corrects object information using object assignment information.

This allows, for the user having different operation capabilities for the left and right touchpads, the assignment of the objects depending on the difference in the operation capabilities for the left and right touchpads. Moreover, with the above configuration, the user can operate, among the touchpads, an easy-to-operate touchpad more frequently and more precisely, and a difficult-to-operate touchpad less frequently and less precisely.

In this embodiment, regarding the assignment of the objects on the display screen, more objects are assigned to the easy-to-operate touchpad in comparison with the difficult-to-operate touchpad, and the size and position of each object are corrected accordingly. With this, even if objects are to be displayed in the same size by an application, the difficult-to-operate touchpad has a larger area or a longer distance between each adjacent object on the display screen than that of the easy-to-operate touchpad. Consequently, the difficult-to-operate touchpad has the larger area assigned to the objects and the longer distance between each adjacent object than the easy-to-operate touchpad does.

Moreover, this embodiment differs from Embodiment 1 in that the left touchpad operation region and the right touchpad operation region do not change even when the application to be executed is changed. For this reason, there is an advantageous effect of facilitating the user's understanding of a correspondence between the left touchpad and the left touchpad operation region and a correspondence between the right touchpad and the right touchpad operation region.

Therefore, the occurrence of wrong operation is prevented, an operation speed is increased, and an operation time is reduced without changing the number of the objects on the display screen, and thus the touchpad operability can be increased. Furthermore, it is possible to prevent the power consumption from increasing, because it is not necessary to enlarge the display screen or use the screens.

It is to be noted that, like Embodiment 1, objects can be also assigned using other methods in this embodiment. For instance, the object assigning unit 602 may assign the objects to the touchpads so that the ratio between the numbers of objects assigned to each touchpad is equal to the operation ratio.

For example, the object assigning unit 602 calculates, using the operation ratio information 410 shown in FIG. 4, the number of objects assigned to the left touchpad 201 and the number of objects assigned to the right touchpad 202, according to (Equation 3) and (Equation 4). The "left touchpad operation ratio" and the "right touchpad operation ratio" are "0.4" and "0.6", respectively, and thus the number of objects assigned to the left touchpad 201 is "12" and the number of objects assigned to the right touchpad 202 is "18".

The object assigning unit 602 assigns, for instance, objects having a small "Display X-axis coordinate" in the object information list 440 to the left touchpad 201, and objects having a large "Display X-axis coordinate" in the object information list 440 to the right touchpad 202. Specifically, the object assigning unit 602 assigns objects having "Index" of "002" to "013" to the left touchpad 201, and objects having "Index" of "014" to "029" to the right touchpad 202. It is to be noted that, here, the "Window" having "Index" of "001" has a large "Display Width", and thus is assigned to both touchpads.

In this case, provisional regions are set between objects "C" and "D" by dividing the display screen 511 into right and left. For instance, a display X-axis coordinate at the right end of the object "C" is "600" and a display X-axis coordinate at the left end of the object "D" is "700", and thus the object assigning unit 602 divides the display screen 511 into two provisional regions at the display X-axis coordinate of "650".

Then, the object information correcting unit 606 corrects object information based on a ratio between the size of each provisional region divided by the object assigning unit 602 and the size of each of predetermined regions. It is to be noted that the predetermined regions are regions assigned to the touchpads, and are specifically the left touchpad operation region 512 assigned to the left touchpad 201 and the right touchpad operation region 513 assigned to the right touchpad 202.

Specifically, the object information correcting unit 606 corrects the object information based on (Equation 9) to (Equation 12). In the above example, the left provisional region, that is, a region which has the "Corresponding Touchpad ID" "0" in the example shown in FIG. 15 has the "Start X-axis Coordinate" of 0, the "Start Y-axis Coordinate" of 0, the "End X-axis Coordinate" of 650, and the "End Y-axis Coordinate" of 1000. The right provisional region, that is, a region which has the "Corresponding Touchpad ID" "1" has the "Start X-axis Coordinate" of 650, the "Start Y-axis Coordinate" of 0, the "End X-axis Coordinate" of 2000, and the "End Y-axis Coordinate" of 1000.

In this example, a corrected display X-axis coordinate in corrected object information indicating that the index is "002" is calculated as $(100-0) \times (2000 \times 0.5)/(650-0)+(0) \approx 154$, according to (Equation 9). A corrected display Y-axis coordinate in the corrected object information is calculated as $(200-0) \times (1000 \times 1.0)/(1000-0)+(0)=200$, according to (Equation 10).

A corrected display width in the corrected object information is calculated as $100 \times (2000 \times 0.5)/(650-0)+(0) \approx 154$, according to (Equation 11). A corrected display height in the corrected object information is calculated as $(100) \times (1000 \times 1.0)/(1000-0)+(0)=100$, according to (Equation 12).

Alternatively, the object assigning unit 602 may assign the objects to the touchpads so that a ratio between sums of areas of objects assigned to each touchpad is equal to the operation ratio. Moreover, the object assigning unit 602 can also assign the objects to the touchpads so that a ratio between operation probabilities, each of which is a probability of operating one of the objects assigned to the respective touchpads, is equal to the operation ratio.

Furthermore, the object assigning unit 602 can also assign the objects to the touchpads so that a reciprocal ratio between smallest areas among the areas of the objects assigned to the respective touchpads is equal to the operation ratio, each of the smallest areas being relative to an area of a corresponding one of the regions. In these cases also, it is possible to assign the objects to the touchpads in the same manner as in the case of assigning the objects to the touchpads so that the ratio between the numbers of the objects assigned to each touchpad is equal to the operation ratio.

Embodiment 3

A display control device according to Embodiment 3 of the present invention is characterized by including an operation ratio calculating unit which calculates an operation ratio based on an operation history.

FIG. 1 shows a configuration of a touchpad input system according to Embodiment 3 of the present invention. The configuration of the touchpad input system according to Embodiment 3 of the present invention is the same as the one in Embodiment 1, and thus a description thereof is omitted below.

Figure 20:
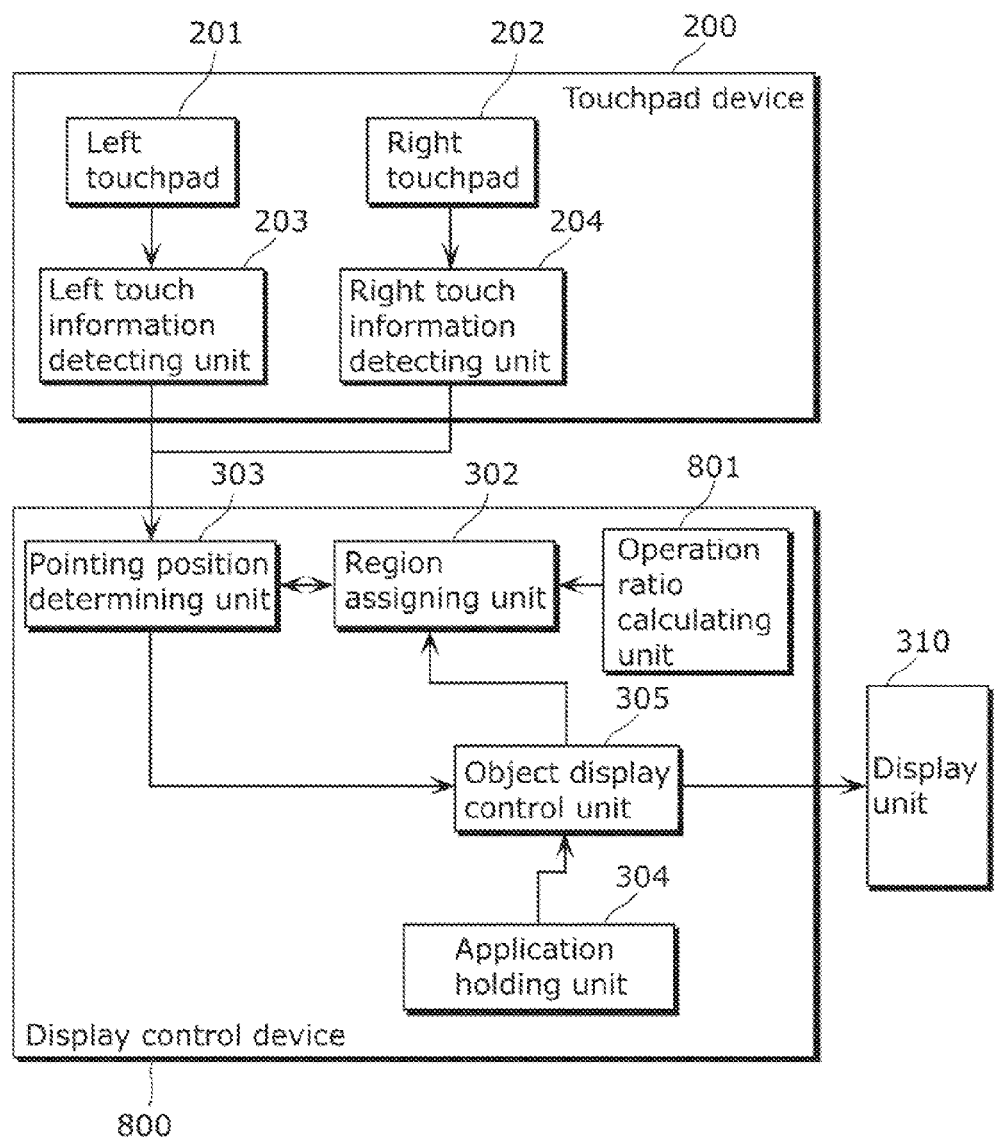
FIG. 20 is a block diagram showing configuration examples of a touchpad device and a display control device according to Embodiment 3 of the present invention.

FIG. 20 is a block diagram showing configuration examples of a touchpad device 200 and a display control device 800 according to Embodiment 3 of the present invention. It is to be noted that the touchpad device 200 according to Embodiment 3 of the present invention is the same as the touchpad device 200 according to Embodiment 1 shown in FIG. 2, and thus a description thereof is omitted below.

Moreover, the display control device 800 differs from the display control device 300 according to Embodiment 1 shown in FIG. 2 in the inclusion of an operation ratio calculating unit 801 instead of the operation ratio setting unit 301. Hereafter, a description of the similarities to Embodiment 1 is omitted, and the differences from Embodiment 1 are mainly described.

The operation ratio calculating unit 801 generates operation ratio information by calculating an operation ratio between the left touchpad 201 and the right touchpad 202, using an operation history of the touchpad device 200 by the user. Then, the operation ratio calculating unit 801 notifies the region assigning unit 302 of the generated operation ratio information.

It is to be noted that, in Embodiment 3 of the present invention, position-on-touchpad information of which the left touch information detecting unit 203 or the right touch information detecting unit 204 notifies the touch information correcting unit 303 is the same as the position-on-touchpad information in Embodiment 1 of the present invention, and is the position-on-touchpad information 400 as shown in FIG. 3, for example.

Moreover, in Embodiment 3 of the present invention, the operation ratio information of which the operation ratio calculating unit 801 notifies the region assigning unit 302 is the same as the operation ratio information in Embodiment 1 of the present invention, and is the operation ratio information 410 as shown in FIG. 4, for example.

Furthermore, in Embodiment 3 of the present invention, region assignment information of which the region assigning unit 302 notifies the pointing position determining unit 303 is the same as the region assignment information in Embodiment 1 of the present invention, and is the region assignment information 420 as shown in FIG. 5, for example.

Moreover, in Embodiment 3 of the present invention, pointing position information of which the pointing position determining unit 303 notifies the object display control unit 305 is the same as the pointing position information in Embodiment 1 of the present invention, and is the pointing position information 430 as shown in FIG. 6, for example.

The following describes operations of the touchpad input system according to Embodiment 3 of the present invention.

Figure 21:
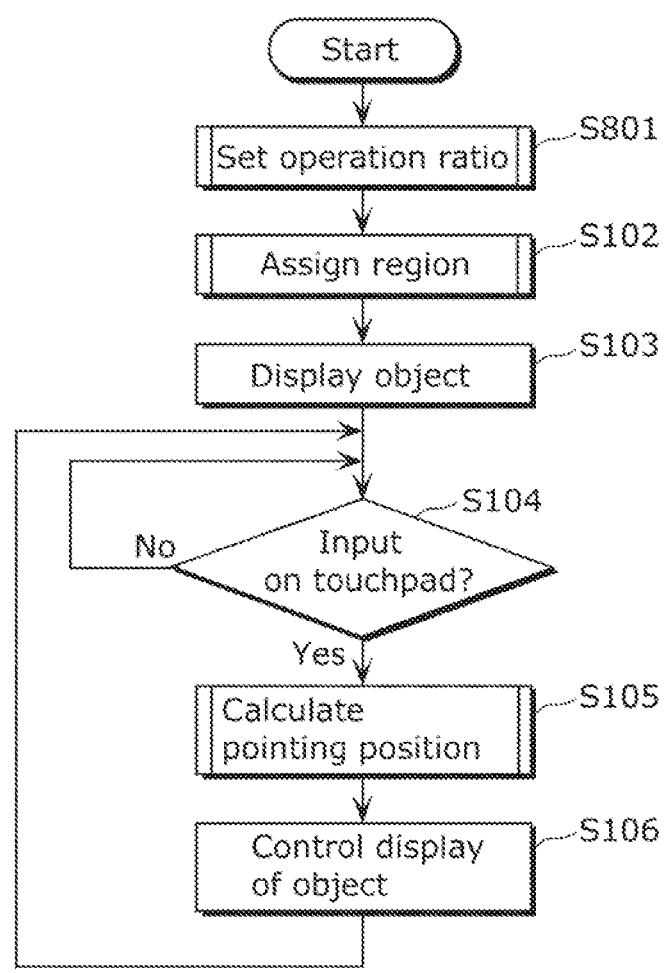
FIG. 21 is a flowchart showing an example of a procedure in which a touchpad input system according to Embodiment 3 of the present invention applies an input on the touchpad device to screen display.

FIG. 21 is a flowchart showing an example of a procedure in which the touchpad input system according to Embodiment 3 of the present invention applies an input on the touchpad device 200 to screen display. The following describes in detail processes in Embodiment 3 of the present invention with reference to FIG. 21.

First, the operation ratio calculating unit 801 generates the operation ratio information 410 by calculating the operation ratio using the operation history or the like, and notifies the region assigning unit 302 the operation ratio information 410 (Step S801).

It is to be noted that subsequent processes (Steps S102 to S106) are the same as those in Embodiment 1, and thus a description thereof is omitted.

Here, a procedure for calculating an operation ratio is described in detail.

FIG. 22 is a diagram showing an example of an operation ratio calculation application for obtaining an operation history of the left touchpad 201 to calculate an operation ratio. The display screen 111 is divided into a left touchpad operation region 912 and a right touchpad operation region 913. Objects such as an operation designating window 914 and a numeric key 915 are all presented in the left touchpad operation region 912.

Here, the operation ratio calculating unit 801 causes the user to select, using the left touchpad 201 of the touchpad device 200, objects representing the same numbers as those shown in the operation designating window 914, and obtains the operation history accordingly.

FIG. 23 is a diagram showing an example of an operation ratio calculation application for obtaining an operation history of the right touchpad 202 to calculate an operation ratio. The display screen 111 is divided into the left touchpad operation region 912 and the right touchpad operation region 913. The objects such as the operation designating window 914 and the numeric key 915 are all presented in the right touchpad operation region 913.

Here, the operation ratio calculating unit 801 causes the user to select, using the right touchpad 202 of the touchpad device 200, the objects representing the same numbers as those shown in the operation designating window 914, and obtains the operation history accordingly.

Each of FIG. 24A and FIG. 24B is a diagram illustratively showing an example of a data structure of an operation history of the user. FIG. 24A shows an operation history 1001 of the left touchpad 201, and FIG. 24B shows an operation history 1002 of the right touchpad 202.

Each of the operation history 1001 and the operation history 1002 includes "Operated Touchpad ID", "Designated Number", "User Input", "Necessary Time", and "Accuracy".

The "Operated Touchpad ID" indicates which touchpad is operated. The "Designated Number" is an input number designated to the user, and a number displayed in the operation designating window 914. The "User Input" indicates a number actually input by the user. The "Necessary Time" indicates, in seconds, a time necessary for the user to input. The "Accuracy" indicates whether or not the user inputs the number as designated. It is to be noted that, for instance, each of the operation history 1001 show in FIG. 24A and the operation history 1002 shown in FIG. 24B is an operation history for one minute.

For example, the operation ratio calculating unit 801 calculates, as an operation ratio, a ratio between the numbers of inputs the user makes with the respective touchpads in a given period of time. Specifically, the operation ratio calculating unit 801 calculates the operation ratio based on a ratio between the number of times a designated number is accurately input on the left touchpad 201 in a given period of time and the number of times a designated number is accurately input on the right touchpad 202 in a given period of time.

For instance, the operation history 1001 of the left touchpad 201 indicates that the number of times an input is accurately made is 8, and the operation history 1002 of the right touchpad 202 indicates that the number of times an input is accurately made is 12. Consequently, the following ratio holds: the operation ratio of the left touchpad 201:the operation ratio of the right touchpad 202=(8/(8+12)):(12/(8+12))= 0.4:0.6.

As stated above, the operation ratio calculating unit 801 executes the operation ratio calculation application for obtaining the operation history of each of the left touchpad 201 and the right touchpad 202, before the application to be executed is executed. Then, the operation ratio calculating unit 801 calculates the operation ratio based on the obtained operation histories, and notifies the region assigning unit 302 of the operation ratio information 410.

As described above, the touchpad input system according to Embodiment 3 of the present invention calculates the operation ratio based on the operation histories, and automatically sets an operation ratio more suitable for the user, thereby further increasing the operability.

Therefore, the occurrence of wrong operation is prevented, an operation speed is increased, and an operation time is reduced without changing the number of the objects on the display screen, and thus the touchpad operability can be increased. Furthermore, it is possible to prevent the power consumption from increasing, because it is not necessary to enlarge the display screen or use the screens.

It is to be noted that although the operation ratio calculating unit 801 calculates the operation ratio using, in the operation histories, the number of times the input is accurately made in the given period of time in this embodiment, the operation ratio calculating unit 801 may calculate the operation ratio using other information in the operation histories. For example, the operation ratio calculating unit 801 may calculate the operation ratio using a wrong operation ratio that is a probability of making an inaccurate input among all inputs. For instance, the operation ratio calculating unit 801 sets the operation ratio of a touchpad having a high wrong operation ratio to be lower than that of a touchpad having a low wrong operation ratio. Specifically, the operation ratio calculating unit 801 may set, as the operation ratio, the reciprocal of the wrong operation ratio for each touchpad.

For instance, in the examples shown in FIGS. 24A and 24B, the wrong operation ratios of the left touchpad 201 and the right touchpad 202 are expressed as 3/11 and 1/13, respectively. Thus, the following ratio holds: the operation ratio of the left touchpad 201:the operation ratio of the right touchpad 202=the reciprocal of the wrong operation ratio of the left touchpad 201:the reciprocal of the wrong operation ratio of the right touchpad 202=11/3:13≈1:4=0.20:0.80.

Moreover, for example, the operation ratio calculating unit 801 may calculate the operation ratio using an average necessary time that is an average value of necessary times each of which is per input. For instance, the operation ratio calculating unit 801 sets the operation ratio of a touchpad having a long average necessary time to be lower than that of a touchpad having a short average necessary time. Specifically, the operation ratio calculating unit 801 may set, as the operation ratio, the reciprocal of the ratio between the average necessary times for each touchpad.

For example, in the examples in FIGS. 24A and 24B, the average necessary time of the left touchpad 201 is 60/11, and the average necessary time of the right touchpad 202 is 60/13. Thus, the following ratio holds: the operation ratio of the left touchpad 201:the operation ratio of the right touchpad 202=the average necessary time of the left touchpad 201:the average necessary time of the right touchpad 202=11/60:13/60≈0.46:0.56.

Furthermore, for instance, the operation ratio calculating unit 801 may calculate the operation ratio using an average movement distance that is an average value of distances of a trajectory drawn by the time an input is made. For example, the operation ratio calculating unit 801 sets the operation ratio of a touchpad having a long average movement distance to be lower than that of a touchpad having a short average distance. Specifically, the operation ratio calculating unit 801 may set, as the operation ratio, the reciprocal of a ratio between the average movement distances for each touchpad. It is to be noted that, here, an operation history includes information indicating a movement distance for each input.

Moreover, for instance, the operation ratio calculating unit 801 may calculate the operation ratio using an average speed that is an average value of speeds of a trajectory drawn by the time an input is made. For example, the operation ratio calculating unit 801 sets the operation ratio of a touchpad having a slow average speed to be lower than that of a touchpad having a fast average speed. Specifically, the operation ratio calculating unit 801 may set, as the operation ratio, a ratio between the average speeds for each touchpad. It is to be noted that, here, an operation history includes information indicating a movement distance and a necessary time for each input.

Furthermore, although the operation histories of the left touchpad 201 and the right touchpad 202 are obtained by executing the operation ratio calculation application for obtaining an operation history in this embodiment, the operation ratio information 410 may be calculated from the operation history of a currently executed application without using the operation ratio calculation application, and notified to the region assigning unit 302, thereby dynamically changing the left touchpad operation region 912 and the right touchpad operation region 913 during the execution of the application.

Embodiment 4

A display control device according to Embodiment 4 of the present invention is characterized by including an operation ratio calculating unit which calculates an operation ratio based on an operation history.

FIG. 13 shows a configuration of a touchpad input system according to Embodiment 4 of the present invention. The configuration of the touchpad input system according to Embodiment 4 of the present invention is the same as the one in Embodiment 2, and thus a description thereof is omitted below.

Figure 25:
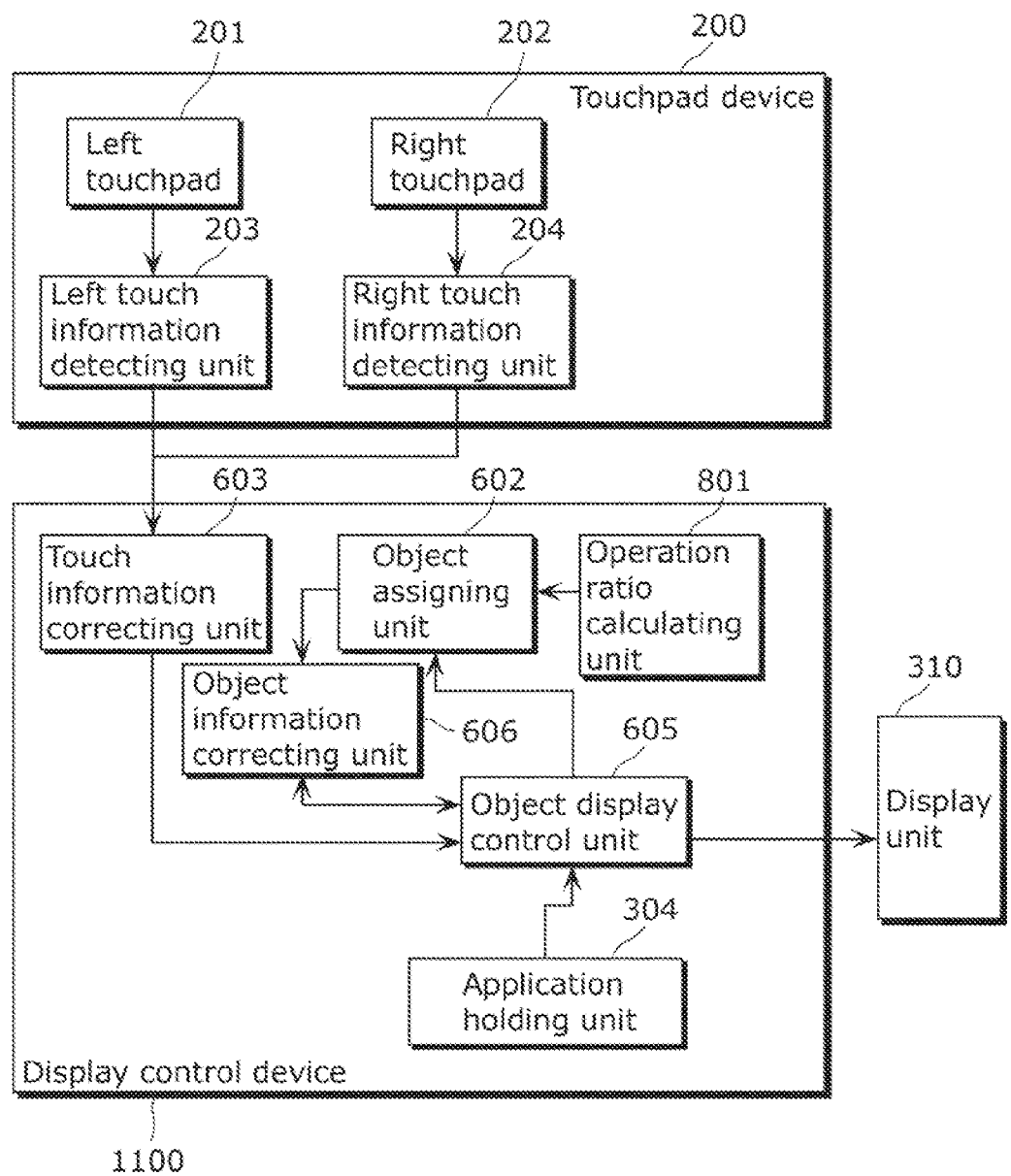
FIG. 25 is a block diagram showing configuration examples of a touchpad device and a display control device according to Embodiment 4 of the present invention.

FIG. 25 is a block diagram showing configuration examples of a touchpad device 200 and a display control device 1100 according to Embodiment 4 of the present invention. It is to be noted that the touchpad device 200 according to Embodiment 4 of the present invention is the same as the touchpad device 200 according to Embodiment 2 shown in FIG. 14, and thus a description thereof is omitted below.

Moreover, the display control device 1100 differs from the display control device 800 according to Embodiment 2 shown in FIG. 14 in the inclusion of an operation ratio calculating unit 801 instead of the operation ratio setting unit 301. Hereafter, a description of the similarities to Embodiment 2 is omitted, and the differences from Embodiment 2 are mainly described.

The operation ratio calculating unit 801 generates operation ratio information by calculating an operation ratio between the left touchpad 201 and the right touchpad 202, using an operation history of the touchpad device 200 by the user. Then, the operation ratio calculating unit 801 notifies the object assigning unit 602 of the generated operation ratio information.

It is to be noted that, in Embodiment 4 of the present invention, position-on-touchpad information of which the left touch information detecting unit 203 or the right touch information detecting unit 204 notifies the touch information correcting unit 603 is the same as the position-on-touchpad information in Embodiment 1 of the present invention, and is the position-on-touchpad information 400 as shown in FIG. 3, for example.

Moreover, in Embodiment 4 of the present invention, operation ratio information of which the operation ratio calculating unit 801 notifies the object assigning unit 602 is the same as the operation ratio information in Embodiment 1 of the present invention, and is the operation ratio information 410 as shown in FIG. 4, for example.

Furthermore, in Embodiment 4 of the present invention, object assignment information of which the object assigning unit 602 notifies the object information correcting unit 606 is the same as the object assignment information in Embodiment 2 of the present invention, and is the object assignment information 700 as shown in FIG. 15, for example.

Moreover, in Embodiment 4 of the present invention, pointing position information of which the touch information correcting unit 603 notifies the object display control unit 605 is the same as the pointing position information in Embodiment 2 of the present invention, and is the pointing position information 710 as shown in FIG. 16, for example.

It is to be noted that, in Embodiment 4 of the present invention, an object information list of which the object display control unit 605 notifies the object information correcting unit 606 is the same as the object information list in Embodiment 1 of the present invention, and is the object information list 440 as shown in FIG. 10, for example.

Furthermore, in Embodiment 4 of the present invention, a corrected object information list of which the object information correcting unit 606 notifies the object display control unit 605 is the same as the corrected object information list in Embodiment 2 of the present invention, and is the corrected object information list 720 as shown in FIG. 17, for example.

The following describes operations of the touchpad input system according to Embodiment 4 of the present invention.

Figure 26:
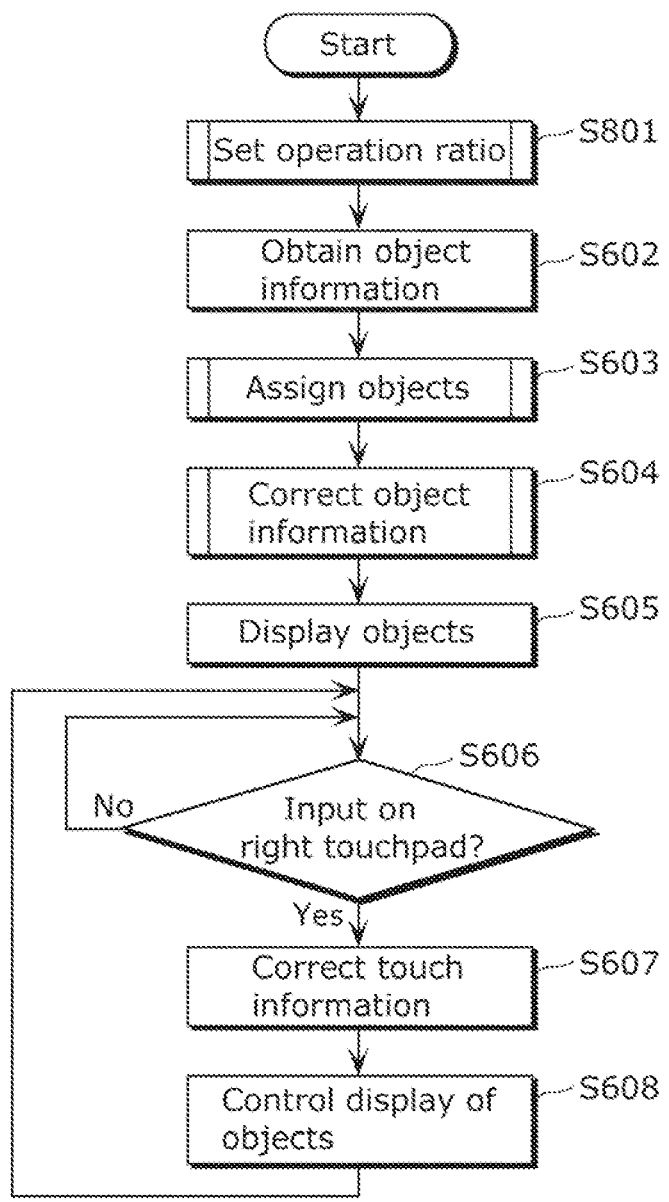
FIG. 26 is a flowchart showing an example of a procedure in which a touchpad input system according to Embodiment 4 of the present invention applies an input on the touchpad device to screen display.

FIG. 26 is a flowchart showing an example of a procedure in which the touchpad input system according to Embodiment 4 of the present invention applies an input on the touchpad device 200 to screen display. The following describes in detail processes in Embodiment 4 of the present invention with reference to FIG. 26.

First, the operation ratio calculating unit 801 generates the operation ratio information 410 by calculating the operation ratio using the operation history or the like, and notifies the object assigning unit 602 of the operation ratio information 410 (Step S801).

It is to be noted that subsequent processes (Steps S602 to S608) are the same as those in Embodiment 2, and thus a description thereof is omitted. Moreover, a procedure for calculating an operation ratio in the operation ratio calculating unit 801 is the same as the one in Embodiment 3, and thus a description thereof is omitted.

As described above, the touchpad input system according to Embodiment 4 of the present invention calculates the operation ratio based on the operation histories, and automatically sets an operation ratio more suitable for the user, thereby further increasing the operability. Furthermore, it is possible to prevent the power consumption from increasing, because it is not necessary to enlarge the display screen or use the screens.

Although the display control device, the touchpad input system, and the display control method according to the present invention have been described based on the embodiments, the present invention is not limited to the embodiments. Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

Moreover, each processing unit included in the display control devices according to Embodiments 1 to 4 is typically realized as an LSI that is an integrated circuit. The processing units may be individually integrated on one chip or part or all of the processing units may be integrated on one chip.

Although the LSI is mentioned here, the integrated circuit can also be called an IC (Integrated Circuit), a system LSI, a super LSI, and an ultra LSI, depending on differences in the degree of integration.

Furthermore, the method of circuit integration is not limited to LSIs, and implementation through a dedicated circuit or a general-purpose processor is also possible. A Field Programmable Gate Array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate each processing unit. There is a possibility of applying biotechnology and the like.

Moreover, part or all of the functions of the display control devices according to Embodiments 1 to 4 of the present invention may be realized by a processor such as a CPU executing a program.

Furthermore, the present invention may be the program or a recording medium on which the program is recorded. In addition, it goes without saying that the program can be distributed via transmission media such as the Internet.

Moreover, all the numbers used above are exemplary for specifically describing the present invention, and the present invention is not limited to the exemplary numbers. In addition, the relations of connection between constituent elements are exemplary for specifically describing the present invention, and the relations of connection for achieving the functions of the present invention are not limited to those.

Furthermore, although the display control device, the touchpad input system, and the display control method are configured using hardware and/or software in the embodiments, these configured using the hardware can be configured using the software, and these configured using the software can be configured using the hardware.

Moreover, the configuration of each of the display control device and the touchpad input system is exemplary for specifically describing the present invention, and the display control device and the touchpad input system according to the present invention do not always need to include all constituent elements of the configuration. To put it differently, the device according to the present invention may include only minimum constituent elements for achieving the advantageous effect of the present invention.

Likewise, the display control method performed by the display control device is exemplary for specifically describing the present invention, and the display control method performed by the display control device according to the present invention does not always need to include all the steps. Stated differently, the display control method according to the present invention may include only minimum steps for achieving the advantageous effect of the present invention. Furthermore, the procedure for performing the steps is exemplary for specifically describing the present invention, and procedures other than the procedure may be used. Moreover, part of the steps may be performed simultaneously (in parallel) with the other steps.

It is to be noted that, as stated above, the present invention can be realized not only as the display control device, the touchpad input system, and the display control method, but also as a program causing a computer to execute the display control method according to this embodiment. Moreover, the present invention can be realized as a computer-readable recording medium on which the program is recorded such as a CD-ROM. Furthermore, the present invention may be realized as information, data, or a signal indicating the program. The program, the information, the data, and the signal may be distributed via a communication network such as the Internet.

Moreover, part or all of the constituent elements in the display control device may be configured of one system LSI in the present invention. The system LSI is a super-multifunctional LSI manufactured by integrating components on one chip and is, specifically, a computer system including a micro processing unit, a ROM, a RAM, and the like.

INDUSTRIAL APPLICABILITY

The present invention produces the advantageous effect of increasing the operability of the touchpads without changing the number of the objects placed on the display screen, and is useful as the touchpad input system including the touchpads, for example.

REFERENCE SIGNS LIST 100, 500 Touchpad input system
111, 511, 1211, 1311 Display screen
112, 512, 912 Left touchpad operation region
113, 513, 913 Right touchpad operation region
114, 115, 514, 515 Object
120, 520 Finger
200, 1200 Touchpad device
201 Left touchpad
202 Right touchpad
203 Left touch information detecting unit
204 Right touch information detecting unit
300, 600, 800, 1100 Display control device
301 Operation ratio setting unit
302 Region assigning unit
303 Pointing position determining unit
304 Application holding unit
305, 605 Object display control unit
310 Display unit
400 Position-on-touchpad information
410 Operation ratio information 420 Region assignment information
430, 710 Pointing position information
440 Object information list
441 Object information
602 Object assigning unit
603 Touch information correcting unit
606 Object information correcting unit
700 Object assignment information
720 Corrected object information list
721 Corrected object information
801 Operation ratio calculating unit
914 Operation designating window
915 Numeric key
1001, 1002 Operation history
1201 Top left touchpad
1202 Top right touchpad
1203 Bottom left touchpad
1204 Bottom right touchpad
1212, 1312 Top left touchpad operation region
1213, 1313 Top right touchpad operation region
1214, 1314 Bottom left touchpad operation region
1215, 1315 Bottom right touchpad operation region

The invention claimed is:

1. A display control device which controls display of objects placed on a screen, based on inputs on touchpads by a user, said display control device comprising:
   an operation ratio setting unit configured to set an operation ratio indicating a ratio between operation capabilities of the user for the respective touchpads;
   an assigning unit configured to assign regions of the screen to the touchpads;
   a position-on-screen determining unit configured to determine a pointing position indicating a position on the screen, based on information indicating one of the assigned regions, the pointing position corresponding to a position of an input on one of the touchpads by the user; and
   a display control unit configured to control display of an object placed at the pointing position,
   wherein said assigning unit is configured to assign at least either the regions of the screen or the objects to the touchpads based on the operation ratio.

2. The display control device according to claim 1,
   wherein the objects are placed at predetermined positions on the screen, and
   said assigning unit is configured to assign the regions of the screen to the touchpads so that larger one of the regions is assigned to one of the touchpads for which the user has a higher operation capability.

3. The display control device according to claim 2,
   wherein said assigning unit is configured to determine the regions of the screen and assign the determined regions to the touchpads so that an area ratio between the regions is equal to the operation ratio.

4. The display control device according to claim 2,
   wherein said assigning unit is configured to determine the regions of the screen and assign the determined regions to the touchpads so that a ratio between the numbers of objects in the respective regions is equal to the operation ratio.

5. The display control device according to claim 2,
   wherein said assigning unit is configured to determine the regions of the screen and assign the determined regions to the touchpads so that a ratio between sums of areas of objects in the respective regions is equal to the operation ratio.

6. The display control device according to claim 2,
   wherein said assigning unit is configured to determine the regions of the screen and assign the determined regions to the touchpads so that a ratio between operation probabilities is equal to the operation ratio, each of the operation probabilities being a probability of operating one of objects in the respective regions.

7. The display control device according to claim 2,
   wherein said assigning unit is configured to determine the regions of the screen and assign the determined regions to the touchpads so that a reciprocal ratio between smallest areas is equal to the operation ratio, each of the smallest areas being a smallest area among areas of the objects in the respective regions and being relative to an area of a corresponding one of the regions.

8. The display control device according to claim 1,
   wherein predetermined regions to be assigned to the touchpads are determined on the screen,
   said assigning unit is configured to assign the objects to the touchpads based on the operation ratio, and
   said display control device further comprises an object correcting unit configured to correct at least one of the objects so that the objects are placed in the regions assigned to the touchpads by said assigning unit.

9. The display control device according to claim 8,
   wherein said object correcting unit is configured to correct at least one of a position, a size, an input-receiving position, and an input-receiving size of the at least one object.

10. The display control device according to claim 8,
    wherein said assigning unit is configured to assign the objects to the touchpads so that the number of objects assigned to each of the touchpads is equal to the number of objects in each of provisional regions that are regions obtained by provisionally assigning the screen so that an area ratio between the provisional regions is equal to the operation ratio.

11. The display control device according to claim 8,
    wherein said assigning unit is configured to assign the objects to the touchpads so that a ratio between the numbers of the objects assigned to the respective touchpads is equal to the operation ratio.

12. The display control device according to claim 8,
    wherein said assigning unit is configured to assign the objects to the touchpads so that a ratio between sums of areas of the objects assigned to the respective touchpads is equal to the operation ratio.

13. The display control device according to claim 8,
    wherein said assigning unit is configured to assign the objects to the touchpads so that a ratio between operation probabilities is equal to the operation ratio, each of the operation probabilities being a probability of operating one of the objects assigned to the respective touchpads.

14. The display control device according to claim 8,
    wherein said assigning unit is configured to assign the objects to the touchpads so that a reciprocal ratio between smallest areas is equal to the operation ratio, each of the smallest areas being a smallest area among areas of the objects assigned to the respective touchpads and being relative to an area of a corresponding one of the regions.

15. The display control device according to claim 1,
    wherein said operation ratio setting unit is configured to calculate the ratio between the operation capabilities of the user for the respective touchpads based on an operation history of the touchpads by the user, and set the calculated ratio between the operation capabilities as the operation ratio.

16. The display control device according to claim 15, wherein the operation history indicates the number of inputs on each touchpad by the user in a given period of time, and
said operation ratio setting unit is configured to calculate, as the ratio between the operation capabilities, a ratio of the number of the inputs.

17. The display control device according to claim 15, wherein the operation history indicates the number of wrong operations on each touchpad by the user, and
said operation ratio setting unit is configured to calculate, as the ratio between the operation capabilities, a reciprocal of a ratio of the number of the wrong operations.

18. The display control device according to claim 15, wherein the operation history indicates a necessary time for the user to make an input on each touchpad, and
said operation ratio setting unit is configured to calculate an average necessary time based on the operation history, and set, as the operation ratio, a reciprocal of a ratio of the calculated average necessary time, the average necessary time being an average value of necessary times to make the input.

19. The display control device according to claim 15, wherein the operation history indicates a distance of a trajectory drawn by the time the user makes an input on each touchpad, and
wherein said operation ratio setting unit is configured to calculate an average movement distance based on the operation history, and set, as the operation ratio, a reciprocal of a ratio of the calculated average movement distance, the average movement distance being an average value of distances of the trajectory drawn by the time the input is made.

20. The display control device according to claim 15, wherein the operation history indicates a necessary time for the user to make an input on each touchpad and a distance of a trajectory drawn by the time the user makes the input on each touchpad, and
said operation ratio setting unit is configured to calculate an average speed based on the operation history, and set, as the operation ratio, a ratio of the calculated average speed, the average speed being an average value of speeds of the trajectory by the time an input is made.

21. A touchpad input system which receives inputs on touchpads by a user and controls display objects placed on a display screen based on the received inputs, said touchpad input system comprising:
a touchpad device including the touchpads;
a display device including the display screen; and
a display control device which controls display of objects placed on the display screen, based on the inputs on the touchpads by the user,
wherein said display control device includes:
an operation ratio setting unit configured to set an operation ratio indicating a ratio between operation capabilities of the user for the respective touchpads;
an assigning unit configured to assign regions of the display screen to the touchpads;
a position-on-screen determining unit configured to determine a pointing position indicating a position on the display screen, based on information indicating one of the assigned regions, the pointing position corresponding to a position of an input on one of the touchpads by the user; and
a display control unit configured to control display of an object placed at the pointing position, and
said assigning unit is configured to assign at least either the regions of the display screen or the objects to the touchpads based on the operation ratio.

22. A display control method for controlling display of objects placed on a screen, based on inputs on touchpads by a user, said display control method comprising:
setting an operation ratio indicating a ratio between operation capabilities of the user for the respective touchpads;
assigning regions of the screen to the touchpads;
determining a pointing position indicating a position on the screen, based on information indicating one of the assigned regions, the pointing position corresponding to a position of an input on one of the touchpads by the user; and
controlling display of an object placed at the pointing position,
wherein in said assigning, at least either the regions of the screen or the objects are assigned to the touchpads based on the operation ratio.

23. A non-transitory computer-readable recording medium for use in a computer, the recording medium having a computer program recorded thereon for causing the computer to execute a display control method for controlling display of objects placed on a screen, based on inputs on touchpads by a user,
wherein the display control method includes:
setting an operation ratio indicating a ratio between operation capabilities of the user for the respective touchpads;
assigning regions of the screen to the touchpads;
determining a pointing position indicating a position on the screen, based on information indicating one of the assigned regions, the pointing position corresponding to a position of an input on one of the touchpads by the user; and
controlling display of an object placed at the pointing position, and in the assigning, at least either the regions of the screen or the objects are assigned to the touchpads based on the operation ratio.

24. An integrated circuit which controls display of objects placed on a screen, based on inputs on touchpads by a user, said integrated circuit comprising:
an operation ratio setting unit configured to set an operation ratio indicating a ratio between operation capabilities of the user for the respective touchpads;
an assigning unit configured to assign regions of the screen to the touchpads;
a position-on-screen determining unit configured to determine a pointing position indicating a position on the screen, based on information indicating one of the assigned regions, the pointing position corresponding to a position of an input on one of the touchpads by the user; and
a display control unit configured to control display of an object placed at the pointing position,
wherein said assigning unit is configured to assign at least either the regions of the screen or the objects to the touchpads based on the operation ratio.

* * * * *